(12) United States Patent
Takeda et al.

(10) Patent No.: US 11,350,396 B2
(45) Date of Patent: May 31, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Qin Mu, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/495,512

(22) PCT Filed: Mar. 20, 2018

(86) PCT No.: PCT/JP2018/010972
§ 371 (c)(1),
(2) Date: Sep. 19, 2019

(87) PCT Pub. No.: WO2018/174046
PCT Pub. Date: Sep. 27, 2018

(65) Prior Publication Data
US 2020/0100220 A1 Mar. 26, 2020

(30) Foreign Application Priority Data
Mar. 21, 2017 (JP) .............................. JP2017-054682

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0048* (2013.01)

(58) Field of Classification Search
CPC ... H04W 72/042; H04L 5/0007; H04L 5/0048
See application file for complete search history.

(56) References Cited

U.S. PATENT DOCUMENTS 9,084,238 B2 7/2015 Gao et al.
2011/0299508 A1* 12/2011 Suzuki .................. H04L 5/0053
370/336
(Continued)

FOREIGN PATENT DOCUMENTS

EP 3113567 A1 * 1/2017 ............. H04L 5/001
EP 3113567 A1 1/2017

OTHER PUBLICATIONS

International Search Report issued in PCT/JP2018/010972 dated Jun. 5, 2018 (2 pages).
(Continued)

*Primary Examiner* — Natasha W Cosme
(74) *Attorney, Agent, or Firm* — Osha Bergman Watanabe & Burton LLP

(57) ABSTRACT

A base station is disclosed including a processor that maps one or more control channel elements (CCEs) in a downlink control channel to one or more resource units that are obtained by an interleaver for interleaving indexes of a plurality of resource units in a control resource set, and a transmitter transmits the downlink control channel. Each of the one or more resource units are being defined as a plurality of resource element groups (REGs). A transmitter transmits the downlink control channel. In other aspects, a terminal and a radio communication method are disclosed.

5 Claims, 22 Drawing Sheets

(56) References Cited

U.S. PATENT DOCUMENTS

2013/0003663 A1\* 1/2013 Blankenship ......... H04L 5/0053
  370/329
2013/0010685 A1 1/2013 Kim et al.
2013/0039284 A1 2/2013 Marinier et al.

OTHER PUBLICATIONS

Written Opinion of the International Searching Authority issued in PCT/JP2018/010972 dated Jun. 5, 2018 (4 pages).
ETRI; "Discussion on NR-PDCCH structure"; 3GPP TSG RAN WG1 #88, R1-1702348; Athens, Greece; Feb. 13-17, 2017 (5 pages).
NTT Docomo, Inc.; "Views on NR-PDCCH structure"; 3GPP TSG RAN WG1 Meeting #88, R1-1702808; Athens, Greece; Feb. 13-17, 2017 (7 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Extended European Search Report issued in counterpart European Patent Application No. 18770546.2, dated Dec. 3, 2020 (10 pages).
Office Action issued in the counterpart European Patent Application No. 18770546.2, dated Jun. 14, 2021 (5 pages).
Office Action issued in the counterpart Indian Patent Application No. 201937037485, dated Jan. 7, 2022 (7 pages).

\* cited by examiner

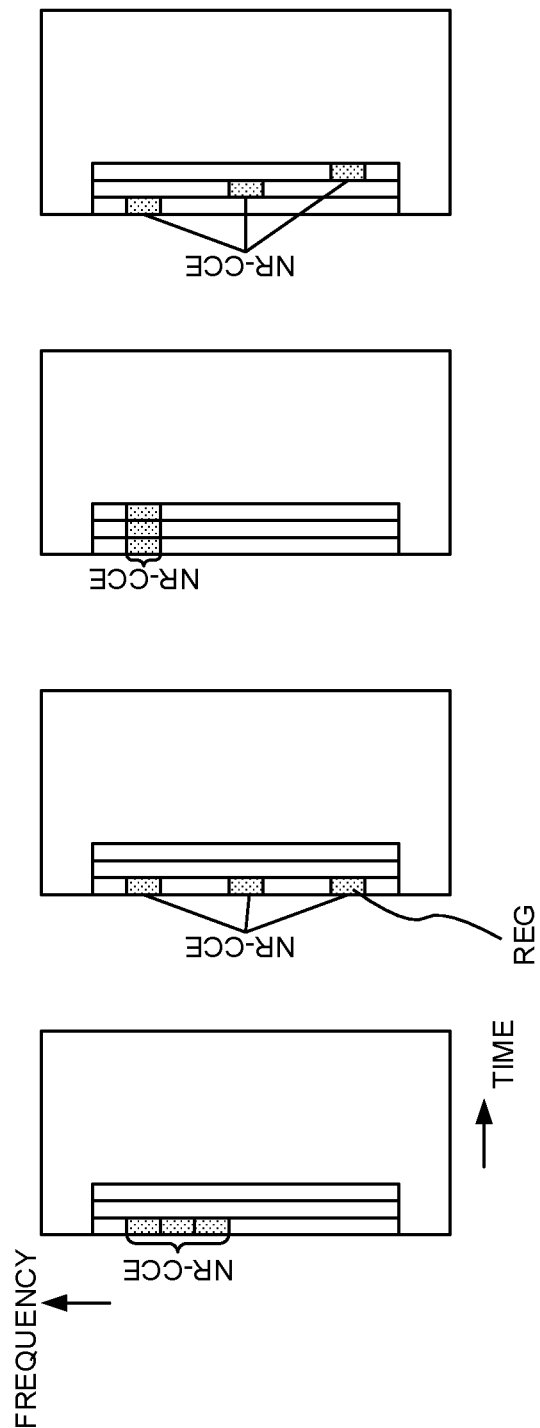

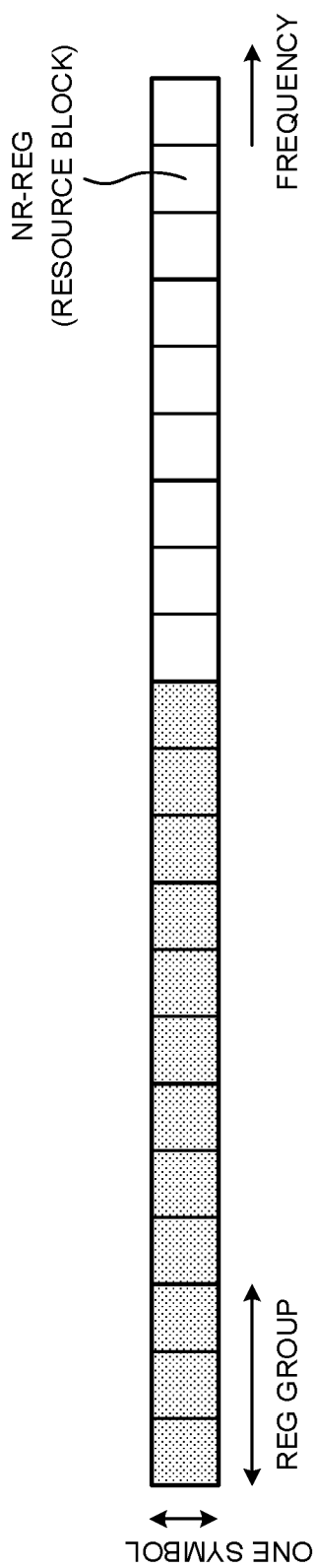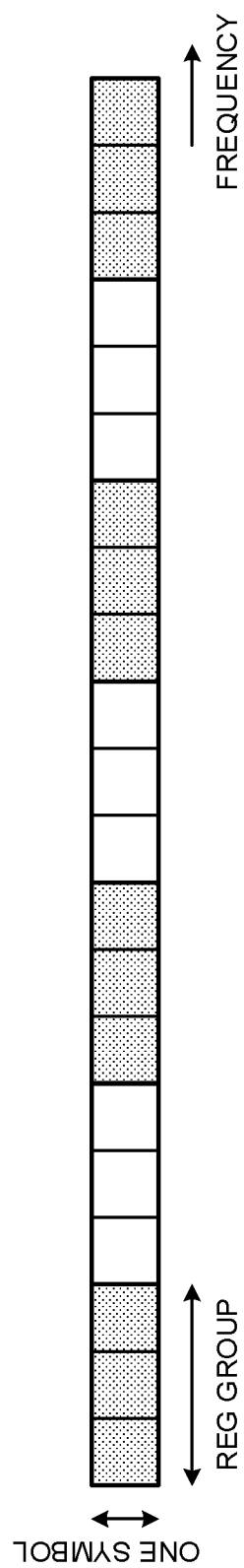
FIG. 2A
FIG. 2B

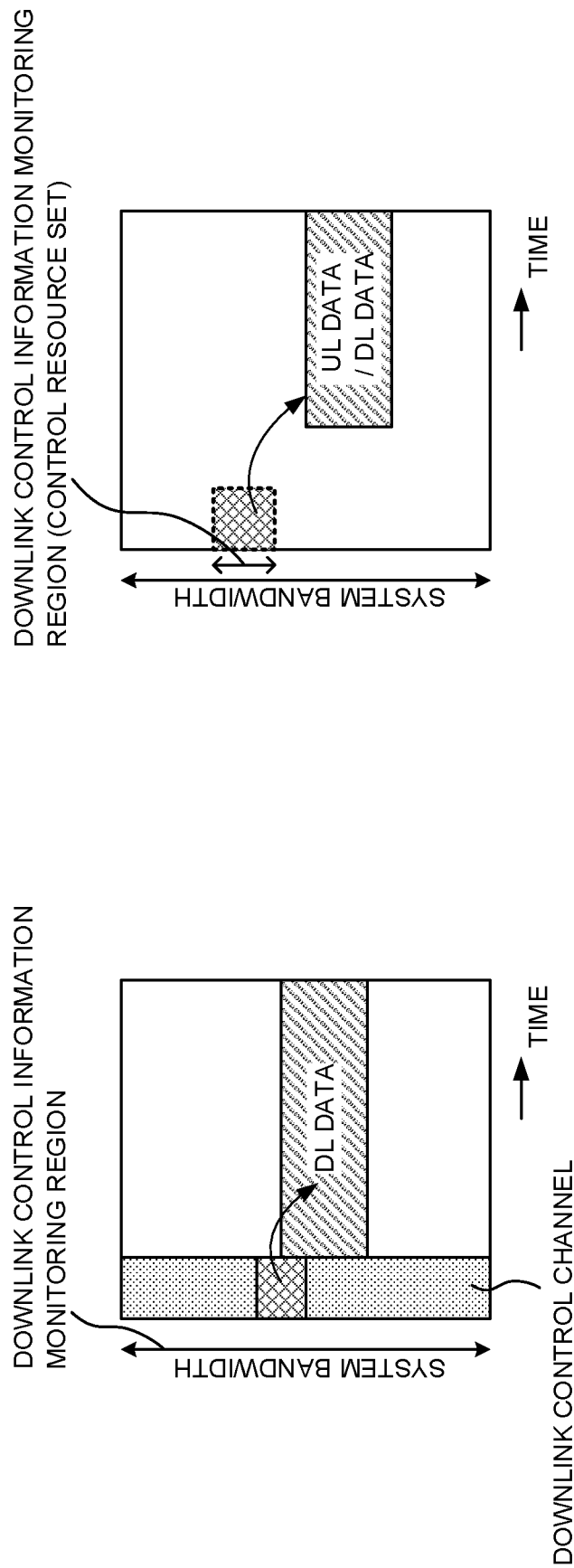

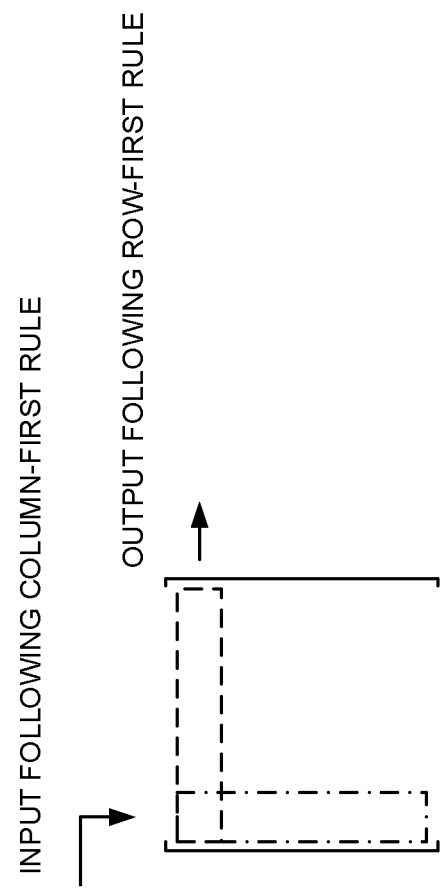

FIG. 6A
1, 2, 3, 4, ... 32
FIG. 6B
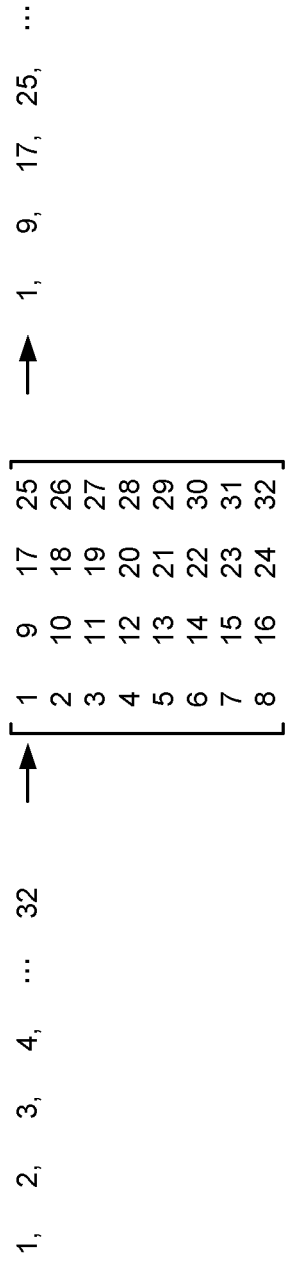
FIG. 6C
1, 9, 17, 25, ...
FIG. 6D
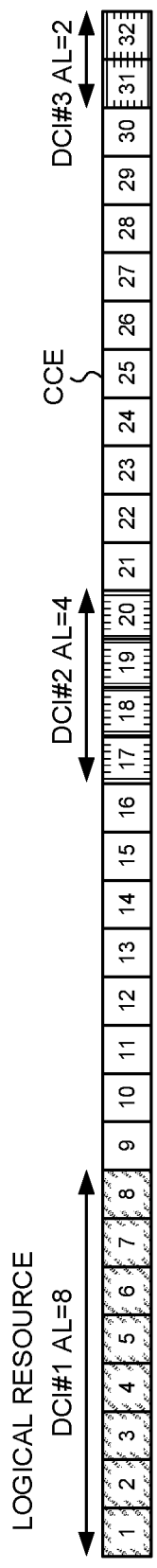
LOGICAL RESOURCE
FIG. 6E
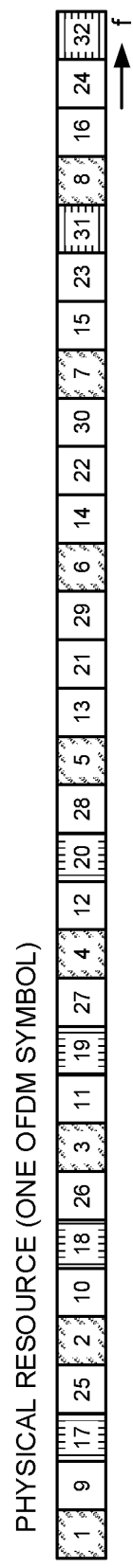
PHYSICAL RESOURCE (ONE OFDM SYMBOL)
FIG. 6F
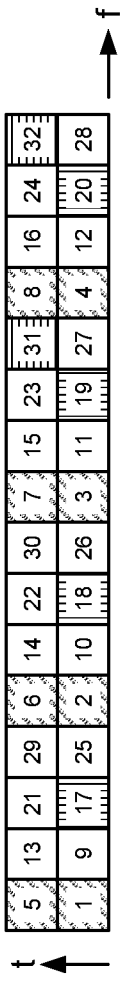
PHYSICAL RESOURCE (TWO OFDM SYMBOLS)

FIG. 8B $$\begin{bmatrix} 1 & 9 & 17 & 25 \\ 2 & 10 & 18 & 26 \\ 3 & 11 & 19 & 27 \\ 4 & 12 & 20 & 28 \\ 5 & 13 & 21 & 29 \\ 6 & 14 & 22 & 30 \\ 7 & 15 & 23 & 31 \\ 8 & 16 & 24 & 32 \end{bmatrix}$$

FIG. 8C
FIRST PERMUTATION METHOD

↑ INTER-ROW PERMUTATION $$\begin{bmatrix} 1 & 9 & 17 & 25 \\ 5 & 13 & 21 & 29 \\ 2 & 10 & 18 & 26 \\ 6 & 14 & 22 & 30 \\ 3 & 11 & 19 & 27 \\ 7 & 15 & 23 & 31 \\ 4 & 12 & 20 & 28 \\ 8 & 16 & 24 & 32 \end{bmatrix}$$

FIG. 8D
SECOND PERMUTATION METHOD

↑ INTER-ROW PERMUTATION $$\begin{bmatrix} 1 & 9 & 17 & 25 \\ 5 & 13 & 21 & 29 \\ 2 & 10 & 18 & 26 \\ 6 & 14 & 22 & 30 \\ 3 & 11 & 19 & 27 \\ 7 & 15 & 23 & 31 \\ 4 & 12 & 20 & 28 \\ 8 & 16 & 24 & 32 \end{bmatrix}$$

↑ SUB-COLUMN PERMUTATION $$\begin{bmatrix} 1 & 9 & 17 & 25 \\ 5 & 13 & 21 & 29 \\ 2 & 10 & 18 & 26 \\ 6 & 14 & 22 & 30 \\ 19 & 27 & 3 & 11 \\ 23 & 31 & 7 & 15 \\ 20 & 28 & 4 & 12 \\ 24 & 32 & 8 & 16 \end{bmatrix}$$

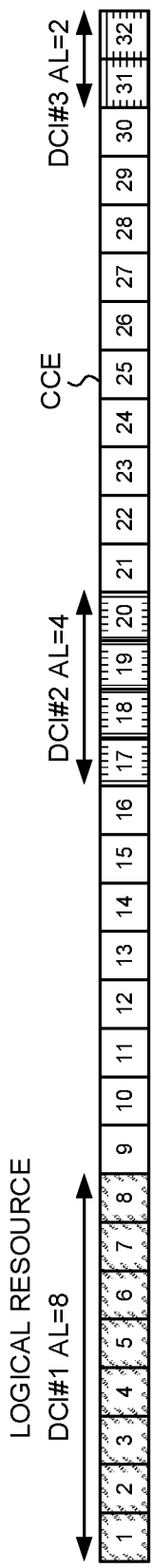
FIG. 9A
FIG. 9B
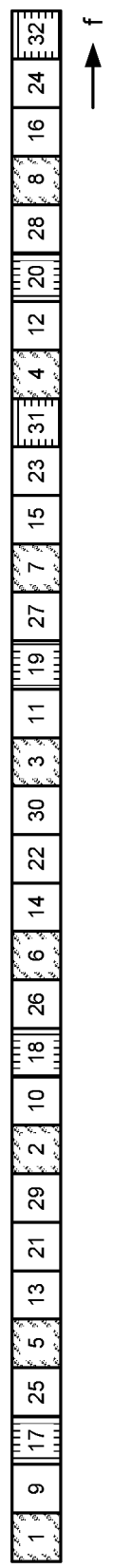
FIG. 9C
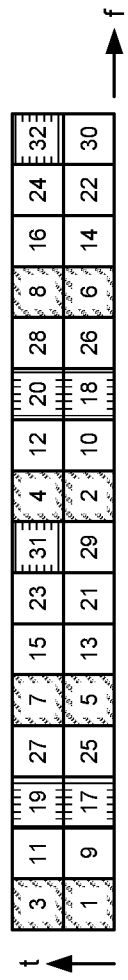
FIG. 9D
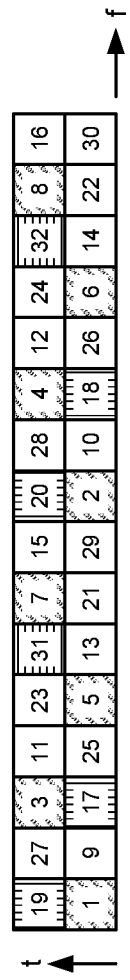

FIG. 10A 1, 2, 3, ... 32

FIG. 10B $\begin{bmatrix} 1 & 3 & 5 & 7 & 9 & 11 & 13 & 15 & 17 & 19 & 21 & 23 & 25 & 27 & 29 & 31 \\ 2 & 4 & 6 & 8 & 10 & 12 & 14 & 16 & 18 & 20 & 22 & 24 & 26 & 28 & 30 & 32 \end{bmatrix}$

FIG. 10C $\begin{bmatrix} 1 & 5 & 9 & 13 & 17 & 21 & 25 & 29 \\ 3 & 7 & 11 & 15 & 19 & 23 & 27 & 31 \\ 2 & 6 & 10 & 14 & 18 & 22 & 26 & 30 \\ 4 & 8 & 12 & 16 & 20 & 24 & 28 & 32 \end{bmatrix}$

FIG. 10D $\begin{bmatrix} 1 & 9 & 17 & 25 \\ 5 & 13 & 21 & 29 \\ 3 & 11 & 19 & 27 \\ 7 & 15 & 23 & 31 \\ 6 & 14 & 22 & 30 \\ 2 & 10 & 18 & 26 \\ 8 & 16 & 24 & 32 \\ 4 & 12 & 20 & 28 \end{bmatrix}$

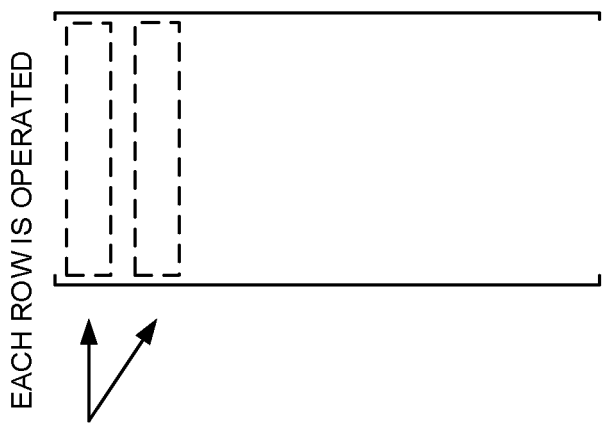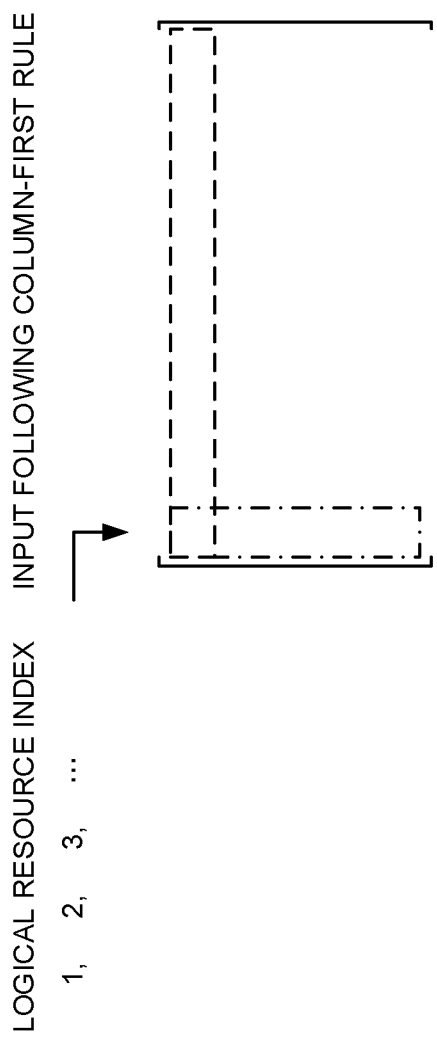
FIG. 11A  FIG. 11B  FIG. 11C

$$\begin{bmatrix} 1 & 3 & 5 & 7 & 9 & 11 & 13 & 15 & 17 & 19 & 21 & 23 & 25 & 27 & 29 & 31 \\ 2 & 4 & 6 & 8 & 10 & 12 & 14 & 16 & 18 & 20 & 22 & 24 & 26 & 28 & 30 & 32 \end{bmatrix}$$
↑

FIG. 12C

$$\begin{bmatrix} 1 & 5 & 9 & 13 & 17 & 21 & 25 & 29 \\ 3 & 7 & 11 & 15 & 19 & 23 & 27 & 31 \\ 2 & 6 & 10 & 14 & 18 & 22 & 26 & 30 \\ 4 & 8 & 12 & 16 & 20 & 24 & 28 & 32 \end{bmatrix}$$
↑

FIG. 12D

$$\begin{bmatrix} 1 & 9 & 17 & 25 \\ 5 & 13 & 21 & 29 \\ 3 & 11 & 19 & 27 \\ 7 & 15 & 23 & 31 \\ 2 & 10 & 18 & 26 \\ 6 & 14 & 22 & 30 \\ 4 & 12 & 20 & 28 \\ 8 & 16 & 24 & 32 \end{bmatrix}$$
↑

FIG. 12E

$$\begin{bmatrix} 1 & 17 \\ 9 & 25 \\ 5 & 21 \\ 13 & 29 \\ 3 & 19 \\ 11 & 27 \\ 7 & 23 \\ 15 & 31 \\ 2 & 18 \\ 10 & 26 \\ 6 & 22 \\ 14 & 30 \\ 4 & 20 \\ 12 & 28 \\ 8 & 24 \\ 16 & 32 \end{bmatrix}$$

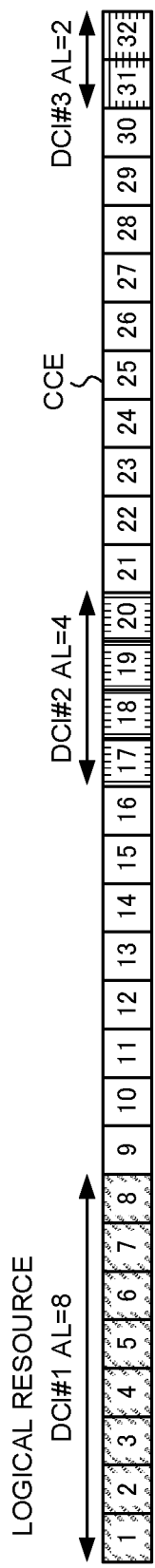
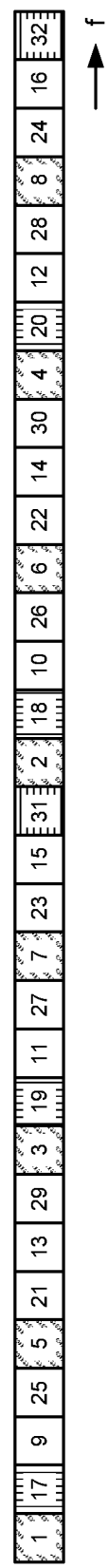
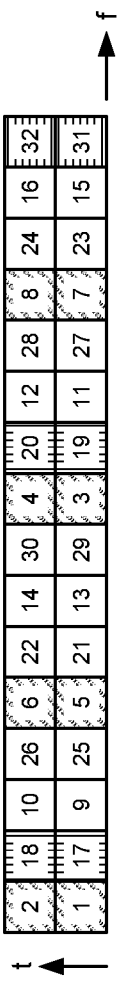
FIG. 13A
FIG. 13B
FIG. 13C

FIG. 14A $[\ 1,\quad 2,\quad 3,\quad \ldots\quad 32\ ]$

FIG. 14B $\begin{bmatrix} 1 & 3 & 5 & 7 & 9 & 11 & 13 & 15 & 17 & 19 & 21 & 23 & 25 & 27 & 29 & 31 \\ 2 & 4 & 6 & 8 & 10 & 12 & 14 & 16 & 18 & 20 & 22 & 24 & 26 & 28 & 30 & 32 \end{bmatrix}$

SUB-COLUMN PERMUTATION →

FIG. 14C $\begin{bmatrix} 1 & 3 & 5 & 7 & 9 & 11 & 13 & 15 & 17 & 19 & 21 & 23 & 25 & 27 & 29 & 31 \\ 30 & 32 & 2 & 4 & 6 & 8 & 10 & 12 & 14 & 16 & 18 & 20 & 22 & 24 & 26 & 28 \end{bmatrix}$

FIG. 14D $\begin{bmatrix} 1 & 5 & 9 & 13 & 17 & 21 & 25 & 29 \\ 3 & 7 & 11 & 15 & 19 & 23 & 27 & 31 \\ 30 & 2 & 6 & 10 & 14 & 18 & 22 & 26 \\ 32 & 4 & 8 & 12 & 16 & 20 & 24 & 28 \end{bmatrix}$

FIG. 14E $\begin{bmatrix} 1 & 9 & 17 & 25 \\ 5 & 13 & 21 & 29 \\ 3 & 11 & 19 & 27 \\ 7 & 15 & 23 & 31 \\ 30 & 6 & 14 & 22 \\ 2 & 10 & 18 & 26 \\ 32 & 8 & 16 & 24 \\ 4 & 12 & 20 & 28 \end{bmatrix}$

FIG. 14F $\begin{bmatrix} 1 & 17 \\ 9 & 25 \\ 5 & 21 \\ 13 & 29 \\ 3 & 19 \\ 11 & 27 \\ 7 & 23 \\ 15 & 31 \\ 30 & 14 \\ 6 & 22 \\ 2 & 18 \\ 10 & 26 \\ 32 & 16 \\ 8 & 24 \\ 4 & 20 \\ 12 & 28 \end{bmatrix}$

FIG. 14G $[\ 1\ 17\ 9\ 25\ 5\ 21\ 13\ 29\ 3\ 19\ 11\ 27\ 7\ 23\ 15\ 31\ 30\ 14\ 6\ 22\ 2\ 18\ 10\ 26\ 32\ 16\ 8\ 24\ 4\ 20\ 12\ 28\ ]^T$

USER TERMINAL AND RADIO COMMUNICATION METHOD

TECHNICAL FIELD

The present invention relates to a user terminal and a radio communication method in next-generation mobile communication systems.

BACKGROUND

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+(plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to13), downlink (DL) and/or uplink (UL) communication are performed using 1-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

A radio base station controls the allocation (scheduling) of data for a user terminal, and reports the schedule of data to the user terminal using downlink control information (DCI). The user terminal monitors the downlink control channel (PDCCH) in which the downlink control information is transmitted, performs receiving processes (demodulation process, decoding process, etc.), and controls receipt of DL data and/or transmission of uplink data based on downlink control information that is received.

In downlink control channels (PDCCH/EPDCCH), transmission is controlled using an aggregation of one or more control channel elements (CCEs/ECCEs). Furthermore, each control channel element is constituted by a plurality of resource element groups (REGs/EREGs). Resource element groups are also used when control channels are mapped to resource elements (REs).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Summary

Future radio communication systems (for example, LTE Rel. 14, 15 or later versions, 5G, NR, etc.) are assumed to control data scheduling based on different configurations than existing LTE systems (for example, LTE Rel. 13 or earlier versions). To be more specific, future radio communication systems are required to support flexible use of numerologies and frequencies, and realize dynamic frame formats. A "numerology" refers to, for example, a set of communication parameters (for example, subcarrier spacing, bandwidth, etc.) applied when transmitting/receiving certain signals.

Also, future radio communication systems are under research to apply configurations that are different from those of existing LTE system, to the control channel and/or the data channel. In this way, when configurations that are different from those used in existing LTE systems are applied, if the mapping technique in the existing LTE system is used as it is, the control information and/or the data may not be properly mapped, problems such as degradation of communication quality and/or throughput may occur.

The present invention has been made in view of the above, and it is therefore an object of the present invention to provide a user terminal and a radio communication method that can reduce the deterioration of communication quality and/or others even when communication is performed by applying different configurations than in existing LTE systems.

DETAILED DESCRIPTION

According to one aspect of the present invention, a user terminal has a control section that controls receipt of downlink control information, and a receiving section that receives the downlink control information in a control resource set, and the downlink control information is distributed and mapped in the control resource set based on a size of the control resource set and at least one aggregation level that can be configured for the downlink control information.

According to the present invention, the deterioration of communication quality and so on can be reduced even when communication is performed by applying different configurations than in existing LTE systems.

BRIEF DESCRIPTION OF DRAWINGS

FIGS. 1A to 1D area diagrams to show examples of methods of arranging NR-REGs;

FIGS. 2A and 2B are diagrams to show examples of mapping of REG groups;

FIGS. 3A and 3B are diagrams to show examples of control resource sets;

FIGS. 5A and 5B are diagrams to show an example of an interleaver, according to a first aspect of the invention;

FIGS. 6A to 6F are diagrams to show examples of CCE-level distribution;

FIGS. 8A to 8D are diagrams to show examples of permutation methods;

FIGS. 9A to 9D are diagrams to show examples of distributed mapping, according to a second aspect of the present invention;

FIGS. 10A to 10D are diagrams to show exemplary iterative operations;

FIGS. 11A to 11C are diagrams to show exemplary operation methods in iterative operations;

FIGS. 12A to 12F are diagram to show an example of a first iterative operation method;

FIGS. 13A to 13C are diagrams to show examples of distributed mapping using the first iterative operation method;

FIGS. 14A to 14G are diagrams to show an example of a second iterative operation method;

DESCRIPTION OF EMBODIMENTS

Figures 4A, 4B, 4C:
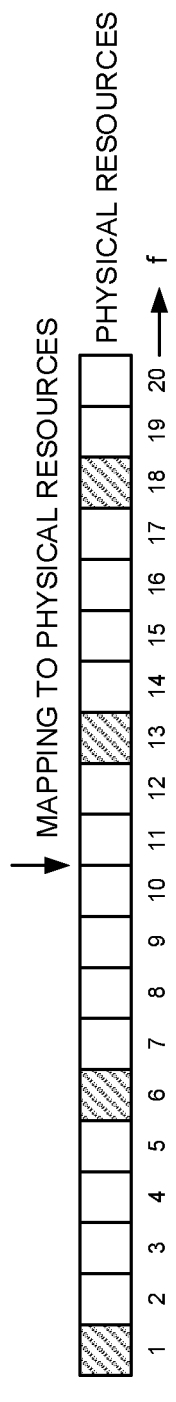
FIGS. 4A to 4C are diagrams to show examples of distributed mapping procedures.

In existing LTE systems, radio base station transmits downlink control information (DCI) to a UE using a downlink control channel (for example, PDCCH (Physical Downlink Control Channel), enhanced PDCCH (EPDCCH (Enhanced PDCCH), etc.). Transmission of downlink control information may be interpreted as transmission of downlink control channels.

DCI may be scheduling information, including at least one of, for example, data-scheduling time/frequency resources, transport block information, data modulation scheme information, HARQ retransmission information, demodulation RS information, and so on. DCI that schedules receipt of DL data and/or measurements of DL reference signals may be referred to as "DL assignment" or "DL grant," and DCI that schedules transmission of UL data and/or transmission of UL sounding (measurement) signals may be referred to as "UL grant."

DL assignment and/or UL grant may include information related to the resources, sequences, transmission formats and so on of channels for transmitting UL control signals (UCI: Uplink Control Information) such as HARQ-ACK feedback in response to DL data, channel measurement information (CSI: Channel State Information) and so on. Also, DCI that schedules UL control signals (UCI: Uplink Control Information) may be set forth apart from DL assignments and UL grants.

A UE is configured to monitor a set of a given number of downlink control channel candidates. To "monitor" in this case means, for example, attempting to decode each downlink control channel for a target DCI format, in the set. Such decoding is also referred to as "blind decoding (BD)" or "blind detection." The downlink control channel candidates are also referred to as "BD candidates," "(E)PDCCH candidates," and so on.

The set of downlink control channel candidates (multiple downlink control channel candidates) to be monitored is also referred to as "search space." A base station places DCI in a given downlink control channel candidates included in the search space. The UE performs blind decoding for one or more candidate resources in the search space, and detects the DCI addressed to the UE. The search space may be configured by high layer signaling that is common between users, or may be configured by user-specific high layer signaling. Also, two or more search spaces may be configured, for the user terminal, in the same carrier.

In existing LTE (LTE Rel. 8 to 12), a plurality of aggregation levels (ALs) are provided in a search space for the purpose of link adaptation. The ALs correspond to the numbers of control channel elements (CCEs)/enhanced control channel elements (ECCEs: Enhanced CCEs) that constitute DCI. Also, the search space is configured so that there are multiple downlink control channel candidates for a given AL. Each downlink control channel candidate is comprised of one or more resource units (CCEs and/or ECCEs).

Cyclic redundancy check (CRC) bits are attached to the DCI. The CRC is masked (scrambled) using UE-specific identifiers (for example, cell-radio network temporary identifiers (C-RNTIs)) or a system-common identifier. The UE can detect the DCI where the CRC is scrambled using the C-RNTI for the subject terminal, and the DCI where the CRC is scrambled using the system-common identifier.

Also, search spaces include a common search space, which is configured for UEs on a shared basis, and a UE-specific search space, which is configured per UE. In the UE-specific search space for the existing LTE PDCCH, the ALs (=the numbers of CCEs) are 1, 2, 4 and 8. The numbers of BD candidates defined in association with the ALs=1, 2, 4 and 8 are 6, 6, 2 and 2, respectively.

Now, 5G/NR is required to support flexible use of numerologies and frequencies, and realize dynamic frame formats. Here, a numerology refers to a set of frequency-domain and/or time domain-communication parameters (for example, at least one of the subcarrier spacing (SCS), the bandwidth, the duration of symbols, the duration of cyclic prefixes (CPs), the duration of transmission time intervals (TTIs), the number of symbols per TTI, the format of radio frames, the filtering process, the windowing process and so on).

Furthermore, in 5G/NR, a new PDCCH format (NR-PDCCH) is under research. In relationship to the NR-PDCCH, there is an on-going study to form a PDCCH candidate with a CCE (NR-CCE) set, and to form an NR-CCE with multiple REGs (NR-REGs). A study is in progress to form NR-REGs with a size of one RB in a given period (for example, in a period of one symbol).

FIGS. 1A to 1D show examples of methods of arranging NR-REG, respectively. The NR-CCE is comprised of a plurality of NR-REGs (here, three NR-REGs). In the exemplary arrangement shown in FIG. 1A, NR-REGs are arranged only in the first symbol, and an NR-CCE is formed with three NR-REGs that are consecutive in the frequency domain. With this arrangement, it is possible to complete blind decoding on a symbol-by-symbol basis, and to apply different precoding or beamforming to different NR-CCEs arranged in different symbols, so that it is possible to time-multiplex NR-CCEs that are formed by applying precoding or beamforming using a simplified precoding device or a beamforming/transmitting device of a base station.

In the exemplary arrangement shown in FIG. 1B, NR-REGs are arranged only in the first symbol, and an NR-CCE is formed with three NR-REGs that are discretely arranged in the frequency domain. This arrangement can provide a frequency diversity gain with the NR-CCE, in addition to having the advantage of the arrangement of FIG. 1A.

In the exemplary arrangement shown in FIG. 1C, NR-REGs are arranged in the same frequency locations in the first to third symbols. According to this arrangement, unlike FIGS. 1A and 1B, one NR-CCE is transmitted using a plurality of symbols, so that its received signal energy can be multiplied by the number of symbols, and, furthermore, different precoding or beamforming can be applied to different symbols in a given NR-CCE, so that it is possible to have a transmission diversity gain by applying precoding or beamforming using a simplified precoding device or a beamforming/transmitting device of a base station.

In the exemplary arrangement shown in FIG. 1D, NR-REGs are arranged in the first to third symbols so as not to overlap with each other in the frequency direction. This arrangement can provide a frequency diversity gain with the NR-CCE, in addition to having the advantage of the arrangement of FIG. 1C.

Furthermore, using REG groups (NR-REG groups), which are each a group of a plurality of NR-REGs, the NR-PDCCH may be constituted by one or more REG groups.

One REG group may include a plurality of NR-REGs that are arranged consecutively in the frequency domain. For example, an NR-REG is comprised of a bandwidth of one RB (for example, twelve subcarriers) in a given symbol period. Here, although an NR-REG will be described as being comprised of a bandwidth of one RB in one symbol period, this is by no means limiting.

FIGS. 2A and 2B show examples of mapping of REG groups. FIG. 2A shows localized mapping, in which mapping is performed such that a plurality of REG groups are arranged consecutively in the frequency domain. The vertical direction is one OFDM symbol, and the horizontal direction is the system band (or a band shorter than the system band). As shown in this drawing, one NR-REG assumed in the NR-PDCCH is comprised of a bandwidth of one RB (for example, twelve subcarriers) in one OFDM symbol period.

In the example shown in FIG. 2A, one REG group is formed with three NR-REGs. Multiple REG groups (in FIG. 2A, four groups are illustrated) are arranged consecutively in the frequency domain (localized mapping). A demodulation reference signal (RS) may be placed in at least one of the resource elements that constitute an REG group.

FIG. 2B shows distributed mapping, in which mapping is performed so that a plurality of REG groups are distributed and arranged in the frequency domain. In the example shown in FIG. 2B, one REG group is formed with three NR-REGs. Multiple REG groups (in FIG. 2B, four groups are illustrated) are distributed and arranged in the frequency domain. A demodulation reference signal (RS) may be placed in at least one of the resource elements that constitute an REG group.

Although FIGS. 2A and 2B show examples in which one REG group is constituted by three NR-REGs, the size of an REG group (the number of NR-REGs that constitute one REG group) may be fixed, or may be changed flexibly.

Now, in conventional LTE systems, a downlink control channel (or downlink control information) is transmitted using the whole system bandwidth (see FIG. 3A). Therefore, regardless of whether or not DL data is allocated in each subframe, a UE needs to monitor the whole system bandwidth to receive (blind-decode) downlink control information.

By contrast with this, in future radio communication systems, communication may not be performed using the whole system band in a given carrier at all times, and it is more likely that communication will be controlled by configuring given frequency regions (also referred to as "frequency bands"), dynamically or semi-statically, depending on the purpose of communication and/or the communicating environment. For example, in future radio communication systems, downlink control information for a given UE needs not be necessarily allocated to the whole system band and transmitted, and, instead, it may be possible to configure a given frequency region to control transmission of downlink control information (see FIG. 3B).

Radio resources comprised of given frequency regions and time regions (for example, one OFDM symbol, two OFDM symbols, and so on) that are configured in a UE may also be referred to as a "control resource set (CORSET)," a "control subband," a "search space set," a "search space resource set," a "control region," a "control subband," an "NR-PDCCH region," and so on.

A control resource set is comprised of given units of resource, and can be configured to be equal to or less than the system bandwidth (carrier bandwidth) or the maximum bandwidth where the user terminal can perform the receiving process. For example, a control resource set may be constituted by one or more RBs (PRBs and/or VRBs) in the frequency direction. Here, an RB refers to, for example, a frequency resource block unit comprised of twelve subcarriers. The UE can monitor for downlink control information within the range of the control resource set, and control receipt. By this means, in the receiving process of downlink control information, the UE does not have to keep monitoring the whole system bandwidth at all times, so that its power consumption can be reduced.

Also, a control resource set refers to resources where downlink control information is mapped, or a resource frame for accommodating the NR-PDCCH. Furthermore, a control resource set can be defined depending on the size of resource units. For example, the size of one control resource set can be configured to be an integer multiple of the size of a resource unit. Also, a control resource set may be constituted by consecutive or non-consecutive resource units.

A resource unit refers to a unit of resource that is allocated to the NR-PDCCH, and may be one of an NR-CCE, an NR-REG and an NR-REG group.

The NR-PDCCH may be mapped so as to be continuous or discontinuous in the frequency domain. To realize this, the following two options are possible. The first option is to map multiple NR-REGs to one NR-CCE by localized mapping or distributed mapping. Assuming the situation where multiple NR-REGs need to be mapped to one NR-CCE by way of localized mapping, and one NR-PDCCH requires multiple NR-CCEs, the second option is to map multiple NR-CCEs to one NR-PDCCH by localized mapping or distributed mapping.

An NR-CCE may be comprised of a plurality of NR-REGs that are distributed (non-consecutive), as shown in FIG. 1B, may be comprised of a plurality of NR-REGs that are localized (consecutive), as shown in FIG. 1A, or may be comprised of a plurality of NR-REG groups that are distributed, using NR-REG groups formed with localized NR-REGs, as shown in FIG. 2B.

Now, examples of the steps of distributed mapping of the NR-PDCCH will be described. Here, a physical region including a plurality of physical resources and a logical region including corresponding logical resources are defined. A logical resource index is assigned to each logical resource.

FIGS. 4A to 4C are diagrams to show examples of the steps of distributed mapping. Here, the logical resources are logical CCEs, the logical resource indices are logical CCE indices, and the physical resources are physical CCEs that are consecutive in the frequency domain. As shown in FIG. 4A, logical CCE indices #1 to #20 are assigned to twenty logical CCEs.

In step 0 of distributed mapping, the range of logical CCE indices to assign to one NR-PDCCH is determined. As shown in FIG. 4A, consecutive logical CCE indices #5 to #8 are assigned to one NR-PDCCH.

In step 1, all logical CCE indices are interleaved based on a given interleaver. As a result of this, consecutive logical CCE indices #5, #6, #7 and #8 are rearranged in locations #13, #1, #18 and #6, as shown in FIG. 4B.

In step 2, the logical CCEs, indicated by the interleaved logical CCE indices, are mapped to the physical CCEs corresponding to the locations of the logical CCE indices. By this means, as shown in FIG. 4C, the logical CCEs allocated to the NR-PDCCH are mapped to non-consecutive physical CCEs in the frequency domain.

However, the problem is how to realize distributed mapping. If distributed mapping is not carried out appropriately, for example, a frequency diversity gain cannot be achieved, and this may lead to a deterioration of receiving performance.

The present inventors have come up with the idea of mapping downlink control information in a control resource set, in distributed mapping, based on the size of the control resource set and at least one aggregation level that can be configured for downlink control information.

In the following description, NR-CCEs, NR-REGs and an NR-REG groups will be also referred to as "CCEs," "REGs" and "REG groups," respectively. An NR-PDCCH mapped to distributed resources may be referred to as a "distributed NR-PDCCH."

Now, embodiments of the present invention will be described below in detail with reference to the accompanying drawings. Note that the radio communication methods according to each embodiment may be applied individually or may be applied in combination.

(Radio Communication Method)

First Embodiment

According to a first embodiment of the present invention, an interleaver for distributed mapping is provided by operating (re-shaping) vectors of logical resource indices having a certain size.

In order to realize a distributed NR-PDCCH, one interleaver is used. The number of rows in an interleaver matrix is determined based on the total number of resource units in the maximum aggregation level (compatible with the maximum aggregation level). The number of columns in the interleaver matrix is determined based on the total number of resource units in one control resource set.

FIGS. 5A and 5B are diagrams to show an example of the interleaver according to the first embodiment. As shown in FIG. 5B, all resource indices corresponding to one control resource set, shown in FIG. 5A, are input in the interleaver matrix following the column-first rule (from the column direction first), and output from the interleaver matrix following the row-first rule (from the row direction first), thereby realizing the interleaver of the first embodiment. The column-first rule refers to the rule in which the top column is processed first, and, when the processing of the first column is finished, the processing moves to the next column, so that this rule is also referred to as the "column major order." The row-first rule refers to the rule in which the top row is processed first, and, when the processing of the first row is finished, the processing moves to the next row, so that this rule is also referred to as the "row major order."

For example, the interleaver has three different options depending on what resource units are used. The first option is CCE-level distribution, which uses CCEs as resource units. The second option is REG group-level distribution, which uses REG groups as resource units. The third option is REG-level distribution, using REGs as resource units.

The interleaver maps the logical resources, indicated by the logical resource indices output from the interleaver matrix, to physical resources, following the frequency-first rule (from the frequency direction first). In accordance with the frequency-first rule, a time resource (for example, an OFDM symbol) is first fixed at the top and processing is performed along the frequency direction, and, when processing is finished in the frequency direction, the processing moves to the next time resource.

Here, assume that there are 192 REGs in one control resource set. Also, assume that one CCE accommodates six REGs, and three REGs form one REG group. That is, the relationship "one control resource set=thirty two CCEs=sixty four REG groups=192 REGs" is established here.

Here, the aggregation level is determined by the number of CCEs, and the maximum aggregation level is 8. The number of resource units corresponding to the maximum aggregation level is eight CCEs=sixteen REG groups=forty eight REGs. Therefore, the number of rows in the interleaver matrix in the event CCE-level distribution is used is eight, the number of rows in the interleaver matrix in the event REG group-level distribution is used is sixteen, and the number of rows in the interleaver matrix in the event REG-level distribution is used is forty eight.

FIGS. 6A to 6F are diagrams to show examples of CCE-level distribution. The resource units here are CCEs, and a control resource set is comprised of thirty two CCEs. Logical resource indices #1 to #32 are assigned to all CCEs in a control resource set, as shown in FIG. 6A. To DCI, a number of logical resource indices to match the aggregation level (AL) for this DCI are assigned. Here, the maximum AL is 8, so that one of 8, 4, 2 and 1 is used as the AL.

Since the number of resource units in the control resource set is thirty two, the number of elements in the interleaver matrix is thirty two. As shown in FIG. 6B, the number of rows in the interleaver matrix is eight, which is the number of CCEs corresponding to the maximum AL 8. Therefore, the number of columns in the interleaver matrix is 32/8=4.

FIG. 6D shows the logical resources (logical region) in the control resource set. For example, the interleaver assigns logical resource indices #1 to #8 to DCI #1 where the AL is 8, assigns logical resource indices #17 to #20 to DCI #2 where the AL is 4, and assigns logical resource indices #31 and #32 to DCI #3 where the AL is 2.

As shown in FIG. 6B, the interleaver inputs the logical resource indices in the interleaver matrix following the column-first rule. Next, as shown in FIG. 6C, the interleaver outputs the logical resource indices from the interleaver matrix following the row-first rule. The location of each logical resource index (physical resource index) output from the interleaver matrix corresponds to the location of a physical resource. In accordance with the frequency-first rule, the locations of physical resources are associated with locations of resource units in the control resource set throughout the frequency domain and the time domain. The location of a physical resource may be referred to as a "physical resource index".

FIG. 6E shows the physical resources in a control resource set (frequency domain) where the size (time duration) of the control resource set in the time direction is one OFDM symbol. In this case, the interleaver maps the logical resources indicated by logical resource indices output from the interleaver matrix to the physical resources in the control resource set following the frequency-first rule. That is, the location of each logical resource index that is output corresponds to the location of a physical resource in the frequency domain.

FIG. 6F shows the physical resources in a control resource set (frequency domain and time domain) where the size (time duration) of the control resource set in the time direction is two OFDM symbols. In this case, the interleaver maps the logical resources indicated by logical resource indices output from the interleaver matrix to the physical resources in the control resource set following the frequency-first rule. For example, the interleaver maps the logical resources indicated by logical resource indices that are output, to physical resources in the first OFDM symbol of the control resource set, in order of frequency. When the mapping to this OFDM symbol is finished, the interleaver maps the logical resources indicated by the rest of the logical resource indices to physical resources in the next OFDM symbol in order of frequency.

Figures 7A, 7B, 7C, 7D, 7E:
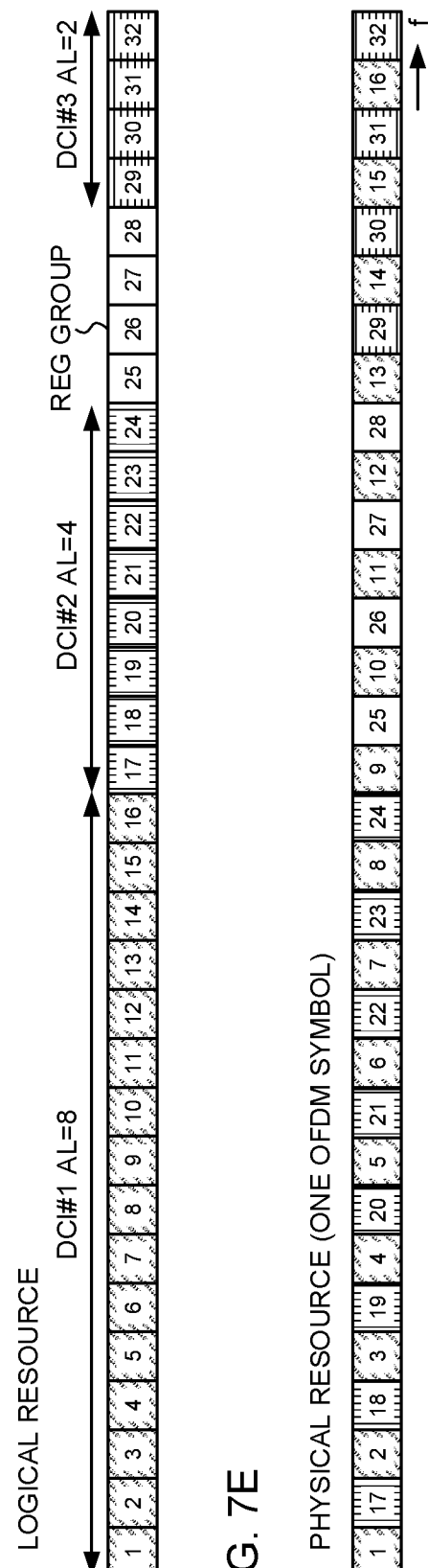
FIGS. 7A to 7E are diagrams to show examples of REG-level distribution.

FIGS. 7A to 7E are diagrams to show examples of REG-level distribution. The resource units here are REGs, and a control resource set is comprised of thirty two REGs. As shown in FIG. 7A and FIG. 6D, logical resource indices #1 to #32 are assigned to all REGs in the control resource set. To DCI, a number of logical resource indices to match the aggregation level (AL) for this DCI are assigned. Here, the maximum AL is 8, and one of 8, 4, 2 and 1 is used as the AL.

Since the number of resource units in the control resource set is thirty two, the number of elements in the interleaver matrix is thirty two. As shown in FIG. 7B, the number of rows in the interleaver matrix is sixteen, which is the number of REGs corresponding to the maximum AL 8. Therefore, the number of columns in the interleaver matrix is 32/16=2.

FIG. 7D shows the logical resources (logical region) in the control resource set. For example, the interleaver assigns logical resource indices #1 to #16 to DCI #1 where the AL is 8, assigns logical resource indices #17 to #24 to DCI #2 where the AL is 4, and assigns logical resource indices #29 to #32 to DCI #3 where the AL is 2.

As shown in FIG. 7B, the interleaver inputs the logical resource indices in the interleaver matrix following the column-first rule. Next, as shown in FIG. 7A, the interleaver outputs the logical resource indices from the interleaver matrix following the row-first rule. By this means, the location of each logical resource index that is output indicates the location of a physical resource index, which is associated with the logical resource index.

FIG. 7E shows the physical resources in a control resource set (frequency domain) where the size (time duration) of the control resource set in the time direction is one OFDM symbol. For example, the interleaver maps the logical resources indicated by logical resource indices that are output, to the physical resources in the control resource set in order of frequency.

According to the first embodiment described above, it is possible to map DCI so as to be distributed in the frequency domain, thereby improving the frequency diversity gain. In particular, the distance in the frequency domain between multiple physical resources allocated to DCI having the maximum AL is maximized. By this means, ALs that require higher quality can have a better performance-improving effect based on a frequency diversity gain.

Note that, in the first embodiment, the number of rows in the interleaver matrix may be determined based on the total number of resource units, corresponding to the smallest number greater than one. In this case, again, the number of columns in the interleaver matrix is determined based on the total number of resource units in one control resource set. For example, in the event CCE-level distribution is used, two CCEs is the number of rows, and the number of columns is (the total number of CCEs in one control resource set)/2. Also, in the event REG-level distribution is used, 2 REGs is the number of rows, and the number of columns is (the total number of REGs in one control resource set)/2. In this case, when DCI is comprised of the minimum integer number of resource units greater than one, the distance in the frequency domain between multiple physical resources is maximized. It follows that improved performance can be achieved at low ALs where the coding rate tends to increase.

Second Embodiment

In a second embodiment of the present invention, in addition to the interleaver of the first embodiment, permutation (rearrangement) of the elements of the interleaver matrix is used.

According to the first embodiment, when the AL is not the maximum AL, as in the cases shown in FIG. 6C and FIG. 7C where the AL is 2 and 4, DCI is not distributed over the entire control resource set, and the frequency diversity cannot be fully utilized. This is to prevent the offset between two adjoining logical resource units from becoming large in the output of the interleaver. As shown in FIG. 6A and FIG. 7A, the offset between two adjoining logical resource units is the length of rows (the number of columns) in the interleaver matrix. Also, the offset is the distance in the frequency domain.

In the second embodiment, inter-row permutation is performed in the interleaver matrix of the first embodiment to increase the frequency offset between two adjoining logical resource units. In the matrix that is provided by inter-row permutation, the offset between two adjoining logical resource units is determined by the number of rows between the two adjoining logical resource units.

Also, when, with the first embodiment, a control resource set includes a plurality of OFDM symbols, one DCI may be mapped to the same frequency resource in different time resources, as illustrated with DCI #1 of FIG. 6F, for example.

Therefore, the second embodiment may additionally use sub-column permutation. By this means, different frequency locations can be reserved among a plurality of OFDM symbols, so that the frequency diversity gain can be improved.

FIGS. 8A to 8D are diagrams to show examples of permutation methods. Here, similar to FIG. 6, assume that the resource units are CCEs, and a control resource set is comprised of thirty two CCEs. As shown in FIG. 8A, thirty-two logical resource indices are assigned to the thirty two CCEs that constitute a control resource set. As shown in FIG. 8B, which is similar to FIG. 6B, the interleaver matrix has eight rows and four columns. Thirty two logical resource indices are entered into the interleaver matrix following the column-first rule.

When the control resource set is one OFDM symbol, the interleaver applies the first permutation method to the interleaver matrix shown in FIG. 8B. For example, as shown in FIG. 8C, the first permutation method performs inter-row permutation to permutate the rows, so that logical resource indices that adjoin each other in the column direction in the interleaver matrix are the largest distance apart.

The inter-row permutation of FIG. 8C moves each of the second-half four rows (the fifth row to the eighth row) of the interleaver matrix to the gaps among the first-half four rows (the first row to the fourth row) of the interleaver matrix.

If the control resource set includes multiple OFDM symbols, the interleaver applies a second permutation method to the interleaver matrix shown in FIG. 8B. For example, as shown in FIG. 8D, the second permutation method performs the same inter-row permutation as in FIG. 8C, and, furthermore, performs sub-column permutation, whereby sub-columns contained in specific rows in the matrix gained by inter-row permutation are permutated. The specific rows are row that are mapped to specific OFDM symbols.

The sub-column permutation of FIG. 8D permutates, out of the four rows (the fifth row to the eighth row) mapped to the second OFDM symbol, the first-half two columns (the first row and the second row) and the second-half two columns (the third row and the fourth row).

FIGS. 9A to 9D are diagrams to show examples of distributed mapping according to the second embodiment. FIG. 9A shows the logical resources (logical region) of a control resource set (similar to FIG. 6A). For example, the interleaver assigns logical resource indices #1 to #8 to DCI #1 where the AL is 8, assigns logical resource indices #17 to #20 to DCI #2 where the AL is 4, and assigns logical resource indices #31 and #32 to DCI #3 where the AL is 2.

FIG. 9B shows the physical resources (frequency domain) of the control resource set when the first permutation method is used. In this case, the size of the control resource set (time duration) in the time domain is one OFDM symbol, and the size of the control resource set (bandwidth) in the frequency domain is thirty two CCEs.

In the mapping of FIG. 9B, DCIs #2 and #3 with ALs (4 and 2) lower than the maximum AL are distributed over a wider band than in the first embodiment (in which an interleaver matrix alone is used). In other words, the distance between multiple resource units that are allocated to DCI #2 and DCI #3 (8) having lower ALs (4 and 2) than the maximum AL is longer than the distance in the first embodiment (4).

FIG. 9C shows the physical resources of the control resource set (frequency domain and time domain) when the first permutation method is used. In this case, the size of the control resource set (time duration) in the time domain is two OFDM symbols, and the size of the control resource set (bandwidth) in the frequency domain is sixteen CCEs.

According to the mapping of FIG. 9C, the distance between multiple resource units allocated to DCI #2 and DCI #3 (8) having lower ALs than the maximum AL (4 and 2) is greater than the distance in the first embodiment (4).

According to the above first permutation method, DCIs having lower ALs than the maximum AL can be distributed and mapped over a wider band than in the first embodiment, so that the frequency diversity gain can be improved.

FIG. 9D shows the physical resources (frequency domain and time domain) in a control resource set when a second permutation method is used.

While, in the mapping result after the first permutation method according to the first embodiment and the second embodiment, DCIs #1 and #2 are mapped to the same frequency in different OFDM symbols, in the mapping of FIG. 9D, the source units allocated to DCIs #1 and #2 are shifted in the frequency domain between two OFDM symbols.

According to the above second permutation method, in the event the time duration of a control resource set is a plurality of OFDM symbols, it is possible to distribute and map DCIs over varying frequencies in a plurality of OFDM symbols, so that the frequency diversity gain can be improved.

Third Embodiment

The interleaver according to a third embodiment of the present invention applies iterative operations to an interleaver matrix.

In order to achieve higher diversity, it is preferable to increase the offset between adjacent logical resource indices. The offset between two adjoining resource units can be expanded by way of executing operations. Iterative operations can expand offset to the maximum possible extent.

FIGS. 10A to 10D are diagrams to show exemplary iterative operations.

When logical resource indices #1 to #32, shown in FIG. 10A, are input in an interleaver matrix where the length of rows (the number of rows) is long and the length of columns (the number of columns) is short, as shown in FIG. 10B, although the offset between adjoining logical resource indices #1 and #2 becomes large, the offset between next adjacent logical resource indices #1 and #3 remains small. As shown in FIG. 10C, by executing an operation on the matrix again, the offset between logical resource indices #1 and #3 increases. By applying yet another operation to the matrix as shown in FIG. 10D, the offset between next adjacent logical resource indices #1 and #5 becomes larger.

The interleaver of the third embodiment is implemented by iterative operations. In iterative operations, following steps 1 and 2 are performed.

In step 1, multiple logical resource indices that indicate all resource units in the control resource set are reshaped into one matrix. The number of rows in this matrix is determined by the number of resource units in one CCE.

In step 2, each row in the matrix is iteratively operated until the number of elements (the number of columns) in each row is one. The number of rows after operation as opposed to one row before operation depends on the relationship between ALs that are supported.

Permutation may be applied during iterative operations. Whether or not to enact permutation may be decided based on a number of communication parameters. For example, the number of OFDM symbols, which indicates the time duration of control resource sets, may be a communication parameter. The communication parameters may be configured using at least one of high layer signaling (for example, RRC (Radio Resource Control) signaling, MAC (Medium Access Control) signaling, etc.) and broadcast information (the MIB (Master Information Block), SIBs (System Information Blocks), etc.).

For example, the interleaver of the third embodiment has three different options depending on resource units. The first option is CCE-level distribution, which uses CCEs as resource units. The second option is REG group-level distribution, which uses REG groups as resource units. The third option is REG-level distribution, which uses REGs as resource units.

The interleaver maps the logical resources indicated by interleaved logical resource indices to physical resources, following the frequency-first rule.

FIGS. 11 A to 11 C are diagrams to show an example of an operation method based on iterative operations. Here, assume that there are 192 REGs in a control resource set. Also, assume that one CCE accommodates six REGs, and three REGs forms one REG group. That is, the relationship "one control resource set=thirty two CCEs=sixty four REG groups=192 REGs" is established here.

Here, the maximum aggregation level is 8. The number of resource units corresponding to the maximum aggregation level 8 is eight CCEs=sixteen REG groups=forty eight REGs.

As shown in FIG. 11A, the interleaver assigns logical resource indices to all resource units in the control resource set. In the event CCE-level distribution is used, the resource units are CCEs. In the event REG group-level distribution is used, the resource units are REG groups. In the event REG-level distribution is used, the resource units are REGs.

As shown in FIG. 11B, the interleaver inputs the logical resource indices in the interleaver matrix following the column-first rule.

The number of rows in the interleaver matrix is determined by the number of resource units in one CCE. In the event CCE-level distribution is used, the number of rows is one because one CCE contains one resource unit. In the event REG group-level distribution is used, the number of rows is two because one CCE contains two resource units. In the event REG-level distribution is used, the number of rows is six because one CCE contains six resource units.

As shown in FIG. 11C, the interleaver reshapes each row into multiple rows by one operation. The number of rows in the interleaver matrix after an operation is determined by the relationship between multiple ALs that are supported. For example, the number of rows derived from each row by one operation is the ratio between two adjoining ALs. If 1, 2, 4 and 8 are the ALs supported, the ratio between two adjoining ALs is two. Therefore, by one operation, each row is reshaped into two rows, the number of rows in the interleaver matrix is doubled, and the number of columns in the interleaver matrix is made ½.

When the ratio between two adjoining ALs is k, by one operation, each row may be reshaped into k rows, the number of rows in the interleaver matrix is made k times as large, and the number of columns in the interleaver matrix is made 1/k.

First, a first iterative operation method, which does not use permutation, will be described. FIGS. 12A to 12F are diagram to show an example of the first iterative operation method.

Here, a case based on CCE-level distribution will be described. As in FIG. 11, if a control resource set contains thirty two CCEs, the number of all elements in the interleaver matrix is thirty two. One CCE accommodates one resource set, so that the number of rows in the interleaver matrix is one at first. Therefore, as shown in FIG. 12A, the interleaver matrix is has one row and thirty two columns at the beginning. In addition, logical resource indices #1 to #32 are assigned to all resource units in the control resource set.

Thereafter, the interleaver arranges the elements of each row in the interleaver matrix in two rows, following the column-first rule, thereby re-shaping each row into two rows. As a result this, as shown in FIG. 12B, the interleaver matrix has two rows and sixteen columns.

After that, the interleaver performs the same operation as in FIG. 12B, and reshapes each row to into two rows. As a result of this, as shown in FIG. 12C, the interleaver matrix has four rows and eight columns. After that, the interleaver performs the same operation as in FIG. 12B, and reshapes each row into two rows. As a result of this, as shown in FIG. 12D, the interleaver matrix has eight rows and four columns. After that, the interleaver performs the same operation as in FIG. 12B, and reshapes each row into two rows. As a result of this, as shown in FIG. 12E, the interleaver matrix has sixteen rows and two columns. After that, the interleaver performs the same operation as in FIG. 12B, and reshapes each row into two rows. As a result of this, as shown in FIG. 12F, the interleaver matrix has thirty two rows and one column (in this drawing, a matrix with one row and thirty two columns, which is the transposed interleaver matrix).

Now that the number of elements in each row (the number of columns) has become one, the interleaver finishes iterative operations.

FIGS. 13A to 13C are diagrams to show examples of distributed mapping using the first iterative operation method. FIG. 13A shows the logical resources (logical region) of a control resource set (similar to FIG. 6A). For example, the interleaver assigns logical resource indices #1 to #8 to DCI #1 where the AL is 8, assigns logical resource indices #17 to #20 to DCI #2 where the AL is 4, and assigns logical resource indices #31 and #32 to DCI #3 where the AL is 2.

FIG. 13B shows the physical resources in a control resource set when the time duration of the control resource set is one OFDM symbol. In this case, the interleaver maps the logical resources indicated by logical resource indices in the interleaver matrix (vector) obtained by iterative operations to the physical resources of frequencies corresponding to the locations of the logical resource indices.

By this means, multiple resource units allocated to each DCI are distributed across the whole bandwidth of the control resource set, regardless of the AL. Also, the distance between multiple resource units allocated to the same DCI is maximized. For example, the distance between multiple resource units allocated to DCI where the AL is 8 is four, the distance between multiple resource units allocated to DCI where the AL is 4 is eight, and the distance between multiple resource units allocated to DCI where the AL is 2 is sixteen.

FIG. 13C shows the physical resources in a control resource set when the time duration of the control resource set is two OFDM symbols. In this case, the interleaver maps the logical resources indicated by logical resource indices in the interleaver matrix (vector) obtained by iterative operations to the physical resources of the control resource set, following the frequency-first rule.

According to the above first iterative operation method, when the time duration of a control resource set is one OFDM symbol, it is possible to maximize the distance in the frequency domain between multiple physical resources allocated to the same DCI, regardless of the AL. By this means, the frequency diversity gain can be improved compared to the first embodiment and the second embodiment.

Next, a second iterative operation method, which uses permutation, will be described. FIGS. 14A to 14G are diagrams to show an example of the second iterative operation method.

Here, similar to FIG. 12 and FIG. 13, a case will be described where CCE-level distribution is used and a control resource set accommodates thirty two CCEs. Therefore, as shown in FIG. 14A, the interleaver matrix has one row and thirty two columns at first. In addition, logical resource indices #1 to #32 are assigned to all resource units in the control resource set.

After that, the interleaver arranging the elements in each row in the interleaver matrix in two rows, following the column-first rule, thereby reshaping each row into two rows. As a result of this, as shown in FIG. 14B, the interleaver matrix has two rows and sixteen columns.

After that, the interleaver performs sub-column permutation. The sub-column permutation here shifts the elements of the second row through two columns to the right, as shown in FIG. 14C. As a result of this, the elements in the last two columns of the second row in FIG. 14B move into the first two columns.

After that, the interleaver performs the same operation as in FIG. 14B, and reshapes each row into two rows. As a result of this, as shown in FIG. 14D, the interleaver matrix has four rows and eight columns. After that, the interleaver performs the same operation as in FIG. 14B, and reshapes each row into two rows. As a result of this, as shown in FIG. 14E, the interleaver matrix has eight rows and four columns. After that, the interleaver performs the same operation as in FIG. 14B, and reshapes each row into two rows. As a result of this, as shown in FIG. 14F, the interleaver matrix has sixteen rows and two columns. After that, the interleaver performs the same operation as in FIG. 14B, and reshapes each row into two rows. As a result of this, as shown in FIG. 14G, the interleaver matrix has thirty two rows and one column (in this drawing, a matrix with one row and thirty two columns, which is the transposed interleaver matrix).

Now that the number of elements in each row (the number of columns) has become one, the interleaver finishes iterative operations.

Figure 15A:
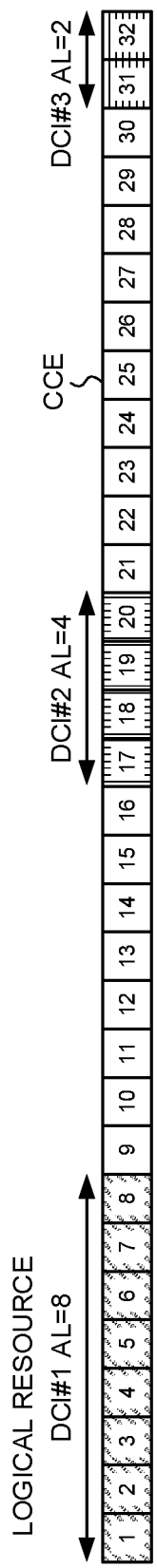
FIGS. 15A to 15C are diagrams to show examples of distributed mapping using the second iterative operation method.
Figure 15B:
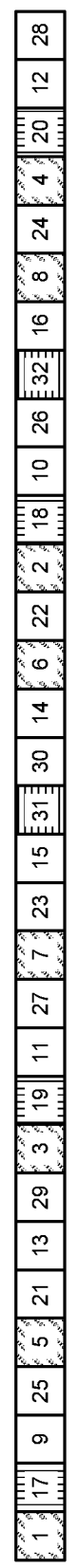
Figure 15C:
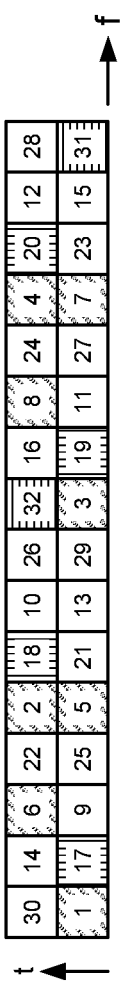

FIGS. 15A to 15C are diagrams to show examples of distributed mapping using the second iterative operation method. FIG. 15A shows the logical resources (logical region) of a control resource set (similar to FIG. 6A). For example, the interleaver assigns logical resource indices #1 to #8 to DCI #1 where the AL is 8, assigns logical resource indices #17 to #20 to DCI #2 where the AL is 4, and assigns logical resource indices #31 and #32 to DCI #3 where the AL is 2.

FIG. 15B shows the physical resources in a control resource set when the time duration of the control resource set is one OFDM symbol. In this case, the interleaver maps the logical resources indicated by logical resource indices that are output from the interleaver matrix (vector) obtained by iterative operations to the physical resources of frequencies corresponding to the locations of the logical resource indices.

By this means, the resource units allocated to each DCI are distributed across the whole bandwidth of the control resource set, regardless of the AL. However, the distance between multiple resource units allocated to the same DCI is not necessarily maximized.

FIG. 15C shows the physical resources in a control resource set when the time duration of the control resource set is two OFDM symbols. In this case, the interleaver maps the logical resources indicated by logical resource indices that are output from the interleaver matrix (vector) obtained by iterative operations to the physical resources of the control resource set, following the frequency-first rule.

According to the above second iterative operation method, the resource units that are allocated to each DCI are distributed access the whole band of the control resource set, regardless of the AL. Also, when the time duration of the control resource set is a plurality of OFDM symbols, multiple resource units allocated to the same DCI over multiple OFDM symbols can be shifted in the frequency domain. As a result of this, the frequency diversity gain can be improved as compared with the first iterative operation method.

Alternative Example

The interleaver described in each of the above embodiments may be applied to data channels. The data channels may be DL data channels (for example, the PDSCH (Physical Downlink Shared CHannel)), or UL data channels (for example, the PUSCH (Physical Uplink Shared CHannel)).

An interleaver may be applied to one OFDM symbol in a given data channel. In other words, the range of interleaving may be a data channel that is scheduled within one OFDM symbol, not a control resource set.

Also, as for the number of elements in the interleaver matrix, the number of RBs (resource blocks) in the scheduled data channel may be used, instead of the number of resource units in the control resource set. Also, for the number of rows in the interleaver matrix, the maximum code block (CB) size, the total number of resource units corresponding to the maximum CB size and/or others may be used, instead of the number of resource units to match the maximum AL. Instead of REGs, REG groups and CCEs, groups of x consecutive RBs may be used as resource units. For example, the value of x is 2, 4, 6, 8 and so on. Note that a plurality of consecutive RBs may be used as resource units.

Figure 16A:
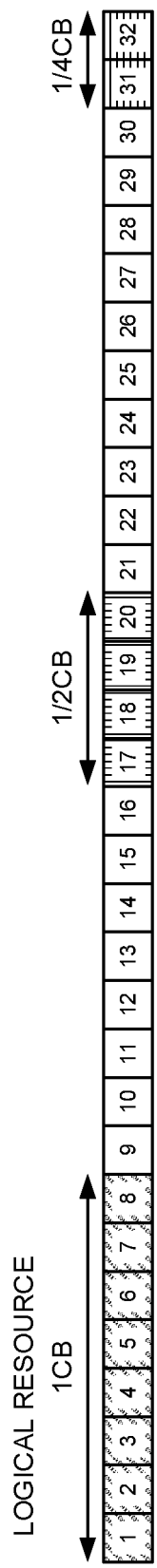
FIGS. 16A to 16B are diagrams to show examples of distributed mapping in data channels.
Figure 16B:
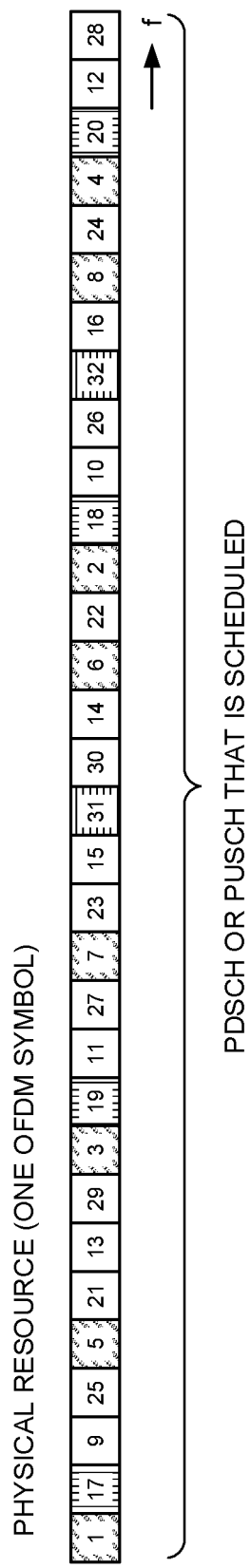

FIGS. 16A to 16B are diagrams to show examples of distributed mapping in data channels. Here, the number of RBs in one OFDM symbol is thirty two.

FIG. 16A shows the logical resources (logical region) in a scheduled data channel. For example, as shown in FIG. 16A, the interleaver assigns logical resource indices #1 to #8 to a given CB, assigns logical resource indices #17 to #20 to ½ of another one CB, and assigns logical resource indices #31 to #32 to ¼ of yet another one CB. In the CB where ½ is indexed, the remaining ½ is assigned physical resource indices from another OFDM symbol. In the CB where ¼ is indexed, the remaining ¾ is assigned physical resource indices from another OFDM symbol.

Here, the interleaver that has been illustrated with the second iterative operation method of the third embodiment (FIG. 14 and FIG. 15) is used.

FIG. 16B shows the physical resources (frequency domain) in a scheduled data channel. In this case, the interleaver maps the logical resources indicated by logical resource indices output from the interleaver matrix to the physical resources of frequencies corresponding to those locations.

According to the alternative example described above, it is possible to map a data channel over a plurality of distributed resource units, so that the frequency diversity gain can be improved.

Note that an interleaver may be provided in the control section of a radio base station. The transmitting/receiving section of the radio base station may transmit information using physical resources (downlink control channels or downlink data channels) that are mapped to the information (downlink control information or downlink data) by the interleaver. Also, the transmitting/receiving section of the radio base station may receive information using physical resources (uplink control channels or uplink data channels) that are mapped to the information (uplink control information or uplink data) by the interleaver.

Also, the control section of a user terminal may have an interleaver. The transmitting/receiving section of the user terminal may transmit information using physical resources (uplink control channels or uplink data channels) that are mapped to the information (uplink control information or uplink data) by the interleaver. Also, the transmitting/receiving section of the user terminal may receive information using physical resources (downlink control channel or downlink data channel) that are mapped to the information (downlink control information or downlink data) by the interleaver.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 17:
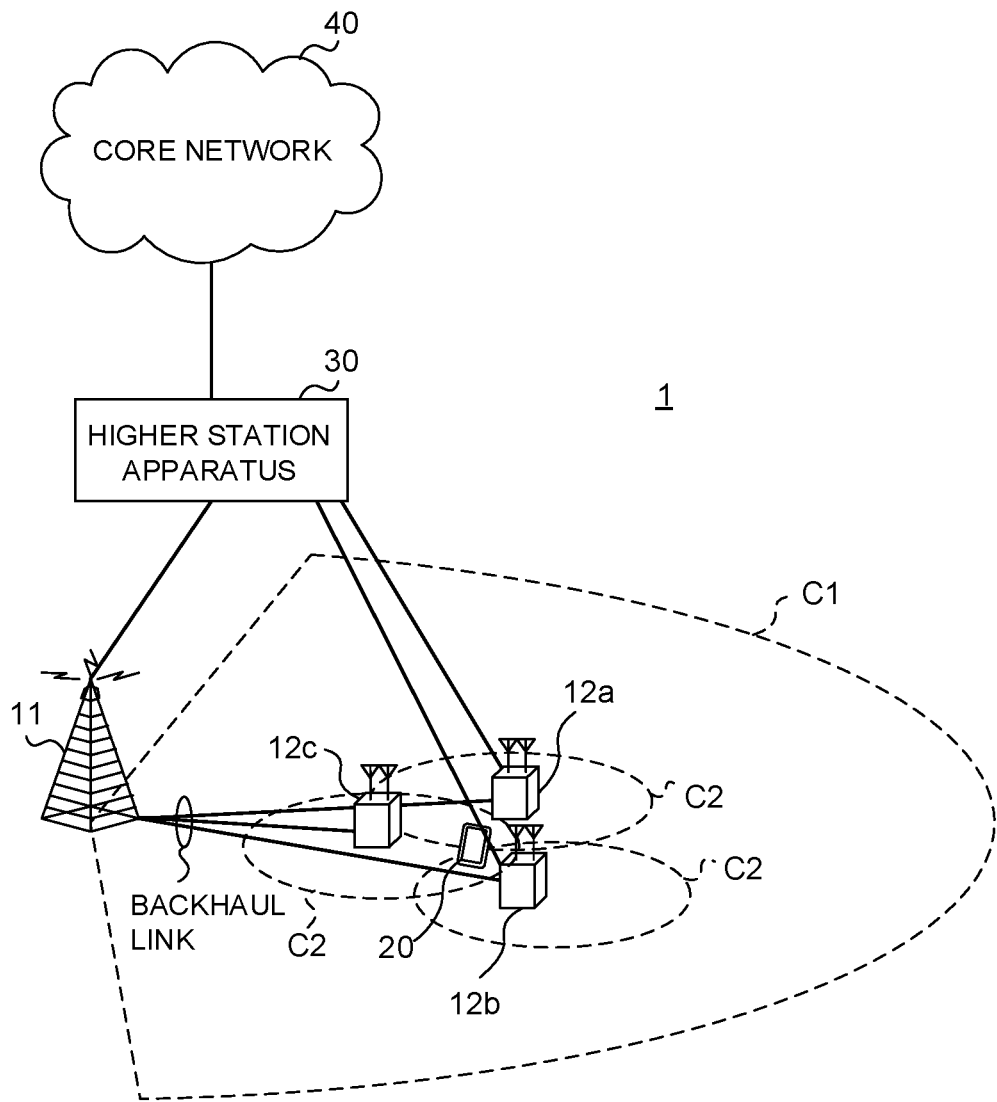
FIG. 17 is a diagram to show an example of a schematic structure of a radio communication system according to one embodiment of the present invention.

FIG. 17 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, downlink control information (DCI) and so on, is communicated by the PDCCH.

Note that scheduling information may be reported via DCI. For example, the DCI for scheduling DL data reception may be referred to as "DL Assignment." The DCI to schedule UL data transmission may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, in the PUCCH, downlink radio quality information (CQI: Channel Quality Indicator), delivery acknowledgment information, scheduling requests (SRs) and so on are communicated. By means of the PRACH, random access preambles for establishing connections with cells are communicated.

Figure 18:
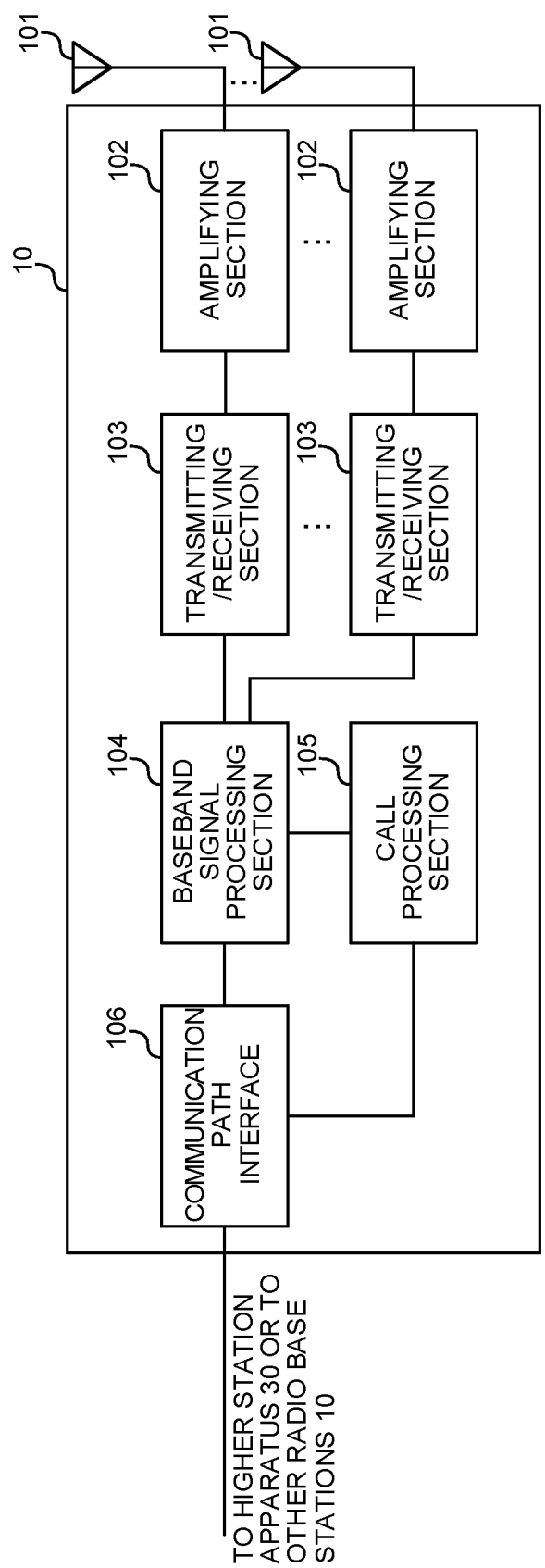
FIG. 18 is a diagram to show an example of an overall structure of a radio base station according to one embodiment of the present invention.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these. (Radio Base Station) FIG. 18 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Also, the transmitting/receiving sections 103 may transmit downlink control information in a control resource set. Also, the transmitting/receiving sections 103 may transmit downlink data in a downlink data channel that is scheduled. Also, the transmitting/receiving sections 103 may transmit uplink data in an uplink data channel that is scheduled.

Figure 19:
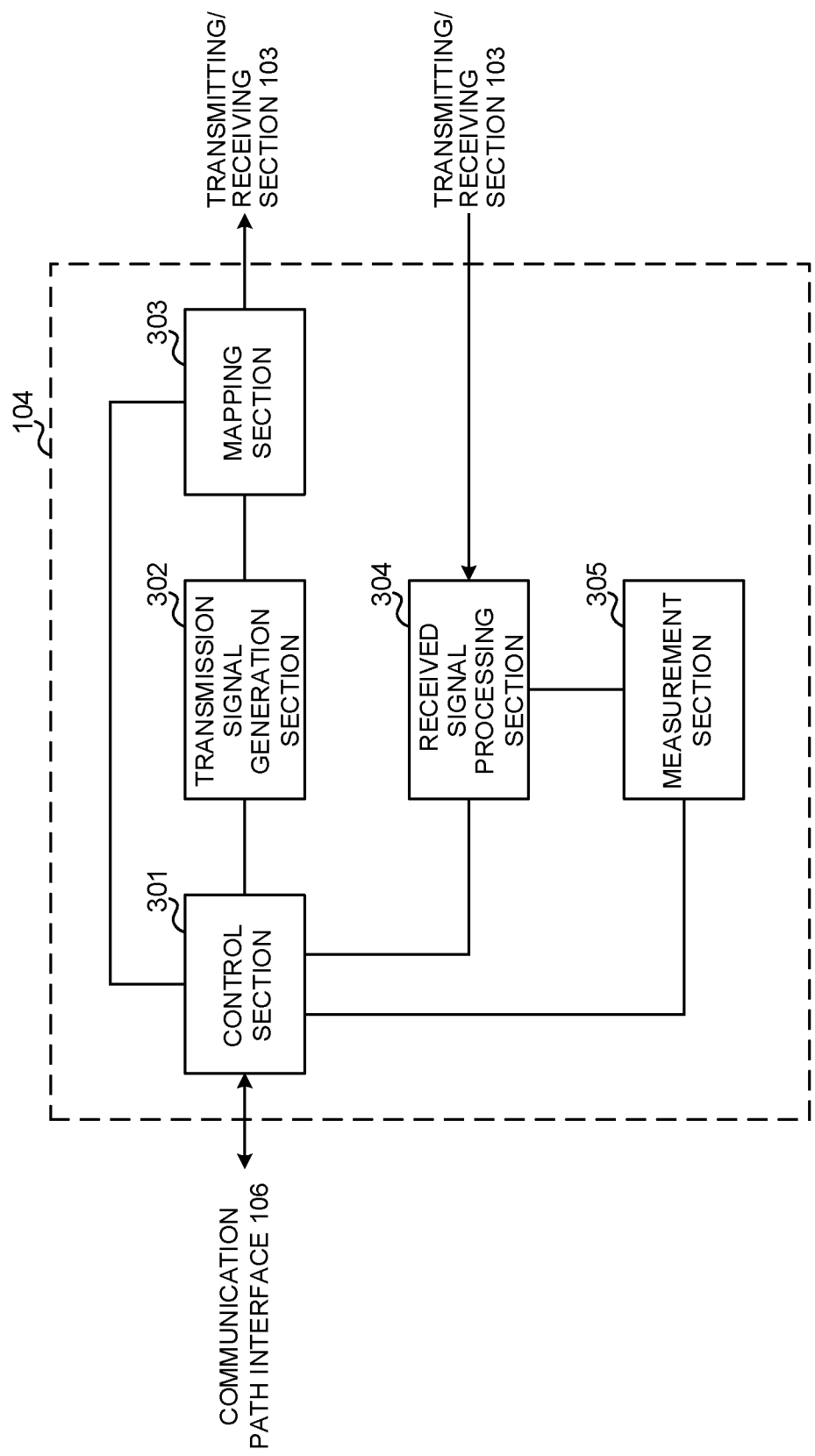
FIG. 19 is a diagram to show an example of a functional structure of a radio base station according to one embodiment of the present invention.

FIG. 19 is a diagram to show an example of functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

Furthermore, the control section 301 also controls the scheduling of uplink data signals (for example, signals transmitted in the PUSCH), uplink control signals (for example signals transmitted in the PUCCH and/or the PUSCH, such as delivery acknowledgment information), random access preambles (for example, signals transmitted in the PRACH), uplink reference signals, and so on.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

Furthermore, the control section 301 may map downlink control information in a distributed manner. The downlink control information may be distributed and mapped in a control resource set based on the size of the control resource set, and at least one aggregation level that can be configured for the downlink control information. Here, the size of the control resource set may be the number of resource units in the control resource set. This at least one aggregation level may be, for example, the maximum value of an aggregation level that can be configured for the downlink control information, or the ratio between adjoining aggregation levels among a plurality of aggregation levels that can be configured for the downlink control information.

A plurality of resource units may be allocated to the downlink control information, and the locations in a control resource set where multiple resource units are mapped may be determined using an interleaver matrix, and the number of elements in the interleaver matrix may be the number of all resource units in a control resource set. The resource units may be NR-CCEs, NR-REG groups, or NR-REGs. The indices of all the resource units may be input to the interleaver matrix following the column-first rule and output from the interleaver matrix following the row-first rule, so that these indices may be rearranged. The resource units allocated to the downlink control information may be mapped to physical resources corresponding to the locations of rearranged indices.

The number of columns or the number of rows in the interleaver matrix may be the number of resource units corresponding to the maximum value of at least one aggregation level.

The locations where a plurality of resource units are mapped may be determined based on a matrix that is obtained by repeating executing operations on an interleaver matrix based on at least one aggregation level. For example, if the number of columns in an interleaver matrix at the beginning is the number of resource units in one CCE, the above operations may reshape each row of the interleaver matrix into two rows, following the column-first rule.

The locations where a plurality of resource units are mapped may be determined based on a matrix that is obtained by applying sub-permutation to the interleaver matrix. This permutation may be sub-column permutation of the interleaver matrix.

Furthermore, the control section 301 may map downlink data in a distributed manner. The downlink data may be distributed and mapped in a data channel based on the size of a downlink data channel that is scheduled, and at least one block size that can be configured for the downlink data. Furthermore, the control section 301 may map uplink data in a distributed manner. The uplink data may be distributed and mapped in a data channel based on the size of an uplink data channel that is scheduled, and at least one block size that can be configured for the uplink data.

Here, the size of the downlink data channel or the uplink data channel that is scheduled may be the number of resource units in the downlink data channel or the uplink data channel. The at least one block size may be, for example, the code block size, or the ratio between adjoining block sizes among a plurality of block sizes that can be configured. The plurality of block sizes may be, for example, a code block size, a ½ code block size, a ¼ code block size, and so on.

(User Terminal)

Figure 20:
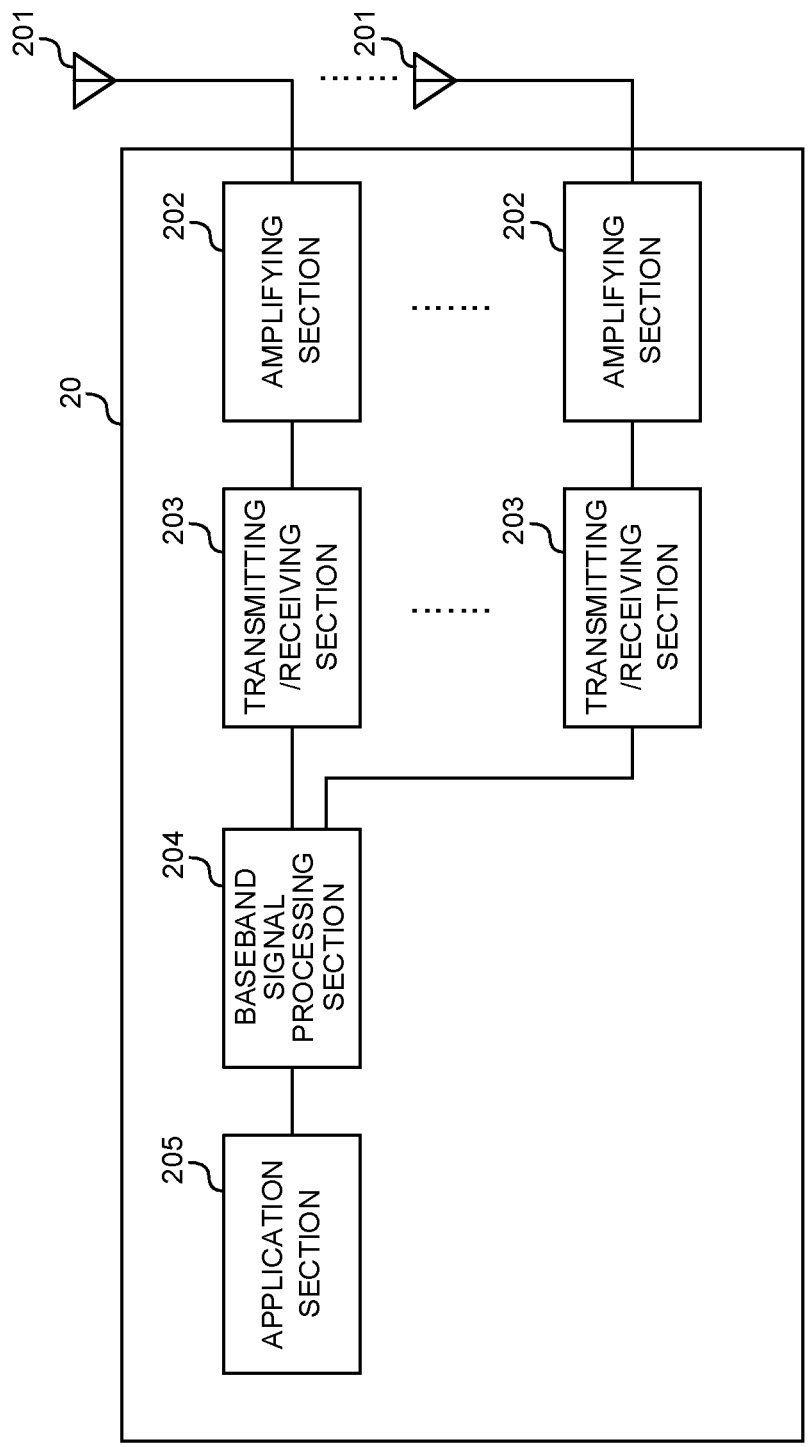
FIG. 20 is a diagram to show an example of an overall structure of a user terminal according to one embodiment of the present invention.

FIG. 20 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may receive downlink control information in a control resource set. Also, the transmitting/receiving sections 203 may receive data in a downlink data channel that is scheduled. Also, the transmitting/receiving sections 203 may transmit uplink data in an uplink data channel that is scheduled.

Figure 21:
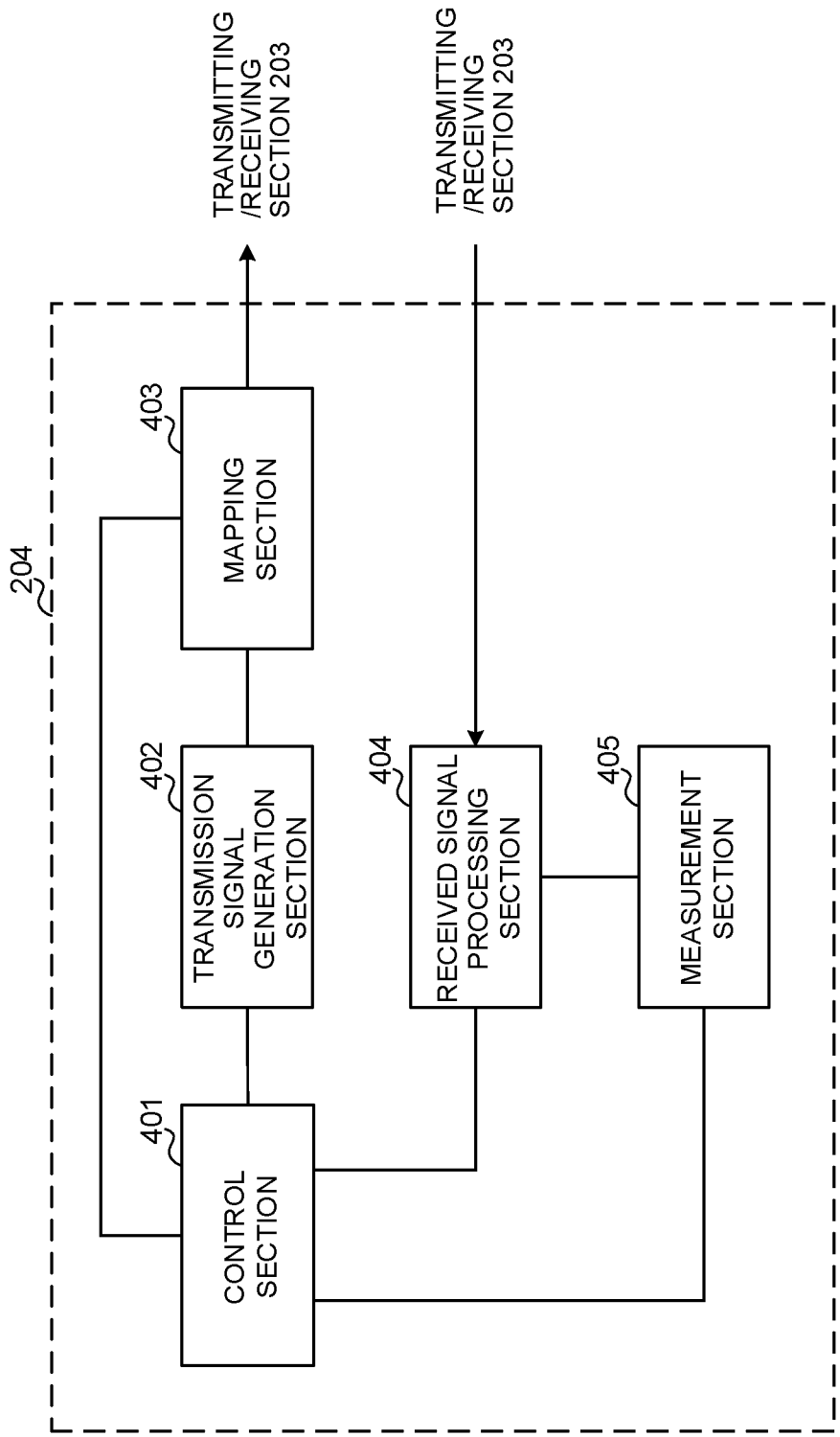
FIG. 21 is a diagram to show an example of a functional structure of a user terminal according to one embodiment of the present invention.

FIG. 21 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

Also, the control section 401 may control receipt of downlink control information. Furthermore, the control section 401 may control receipt of downlink data. In addition, the control section 401 may control receipt of uplink data.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 22:
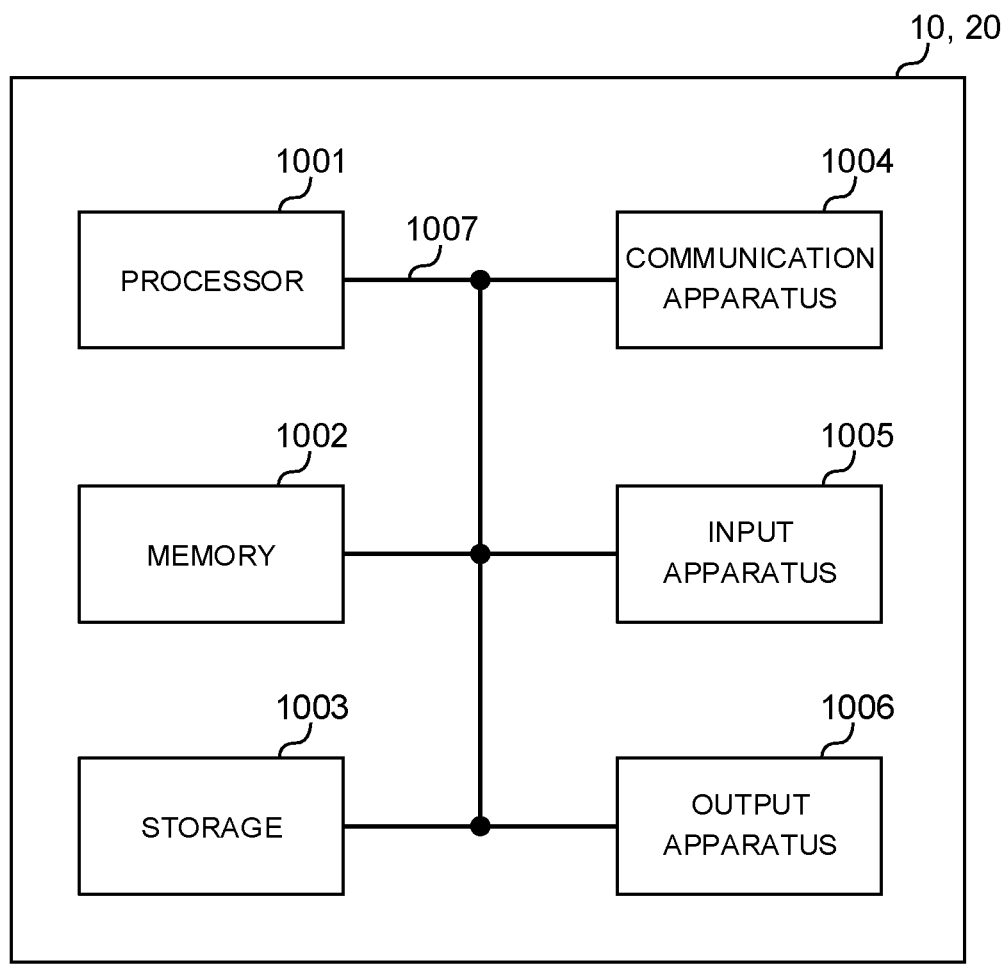
FIG. 22 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 22 is a diagram to show an example of a hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 And a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, one ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG)," a "resource element group (REG)," an "PRB pair," an "RB pair" and so on.

Furthermore, a resource block may be comprised of one or more resource elements (REs). For example, one RE may be a radio resource region of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented in other information formats. For example, radio resources may be specified by given indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX(registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-054682, filed on Mar. 21, 2017, including the specification, drawings and abstract, is incorporated herein by reference in its entirety.

The invention claimed is:

1. A base station comprising:
   a processor of the base station that maps a control channel element (CCE) in a downlink control channel to a plurality of resource element group (REG) groups that are obtained by an interleaver; and
   a transmitter that transmits the downlink control channel,
   wherein the interleaver interleaves a plurality of indexes,
   the plurality of indexes respectively correspond to the plurality of REG groups in a control resource set,
   each of the plurality of REG groups is defined as a plurality of REGs,
   the control resource set consists of one or more resource blocks in frequency domain and one or more orthogonal frequency division multiplexing (OFDM) symbols in time domain, and
   a number of elements of the interleaver is a number of all REG groups in the control resource set.

2. A terminal comprising:
   a receiver that receives configuration information of a control resource set; and
   a processor of the terminal that monitors a downlink control channel candidate in the control resource set that is based on the configuration information, wherein a control channel element (CCE) in the downlink control channel candidate is mapped to a plurality of resource element group (REG) groups that are obtained by an interleaver, the interleaver interleaves a plurality of indexes, the plurality of indexes respectively correspond to the plurality of REG groups in the control resource set, each of the plurality of REG groups is defined as a plurality of REGs, the control resource set consists of one or more resource blocks in frequency domain and one or more orthogonal frequency division multiplexing (OFDM) symbols in time domain, and a number of elements of the interleaver is a number of all REG groups in the control resource set.

3. The terminal according to claim 2, wherein the CCE consists of six REGs.

4. A radio communication method for a terminal, comprising:

receiving configuration information of a control resource set; and monitoring a downlink control channel candidate in the control resource set that is based on the configuration information, wherein a control channel element (CCE) in the downlink control channel candidate is mapped to a plurality of resource element group (REG) groups that are obtained by an interleaver, the interleaver interleaves a plurality of indexes, the plurality of indexes respectively correspond to the plurality of REG groups in the control resource set, each of the plurality of REG groups is defined as a plurality of REGs, the control resource set consists of one or more resource blocks in frequency domain and one or more orthogonal frequency division multiplexing (OFDM) symbols in time domain, and a number of elements of the interleaver is a number of all REG groups in the control resource set.

5. A system comprising:

a base station that comprises:
  a processor of the base station that maps a control channel element (CCE) in a downlink control channel to a plurality of resource element group (REG) groups that are obtained by an interleaver; and
  a transmitter that transmits the downlink control channel; and a terminal that comprises:
  a receiver that receives configuration information of a control resource set; and
  a processor of the terminal that monitors a downlink control channel candidate in the control resource set that is based on the configuration information, wherein the interleaver interleaves a plurality of indexes, the plurality of indexes respectively correspond to the plurality of REG groups in the control resource set, each of the plurality of REG groups is defined as a plurality of REGs, the control resource set consists of one or more resource blocks in frequency domain and one or more orthogonal frequency division multiplexing (OFDM) symbols in time domain, and a number of elements of the interleaver is a number of all REG groups in the control resource set.

* * * * *